US 8,671,154 B2

(12) United States Patent
Davis et al.

(10) Patent No.: US 8,671,154 B2
(45) Date of Patent: Mar. 11, 2014

(54) SYSTEM AND METHOD FOR CONTEXTUAL ADDRESSING OF COMMUNICATIONS ON A NETWORK

(75) Inventors: Marc Eliot Davis, San Francisco, CA (US); Julie Herendeen, Palo Alto, CA (US); Marco Boerries, Los Altos Hills, CA (US); Christopher William Higgins, Portland, OR (US); Joseph James O'Sullivan, Oakland, CA (US); Ronald Martinez, San Francisco, CA (US); Robert Carter Trout, Burlingame, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1342 days.

(21) Appl. No.: 11/953,454

(22) Filed: Dec. 10, 2007

(65) Prior Publication Data
US 2009/0150514 A1    Jun. 11, 2009

(51) Int. Cl.
*G06F 15/16*  (2006.01)

(52) U.S. Cl.
USPC .......................................... 709/217; 709/204

(58) Field of Classification Search
None
See application file for complete search history.

(56) References Cited

U.S. PATENT DOCUMENTS

| | | | |
|---|---|---|---|
| 5,446,891 A | 8/1995 | Kaplan et al. | |
| 5,493,692 A | 2/1996 | Theimer et al. | |
| 5,583,763 A | 12/1996 | Atcheson et al. | |
| 5,651,068 A | 7/1997 | Klemba et al. | |
| 5,761,662 A | 6/1998 | Dasan | |
| 5,764,906 A | 6/1998 | Edelstein et al. | |
| 5,781,879 A | 7/1998 | Arnold et al. | |
| 5,784,365 A | 7/1998 | Ikeda | |
| 5,794,210 A | 8/1998 | Goldhaber et al. | |
| 5,802,510 A * | 9/1998 | Jones ..................................... 1/1 |
| 5,835,087 A | 11/1998 | Herz et al. | |
| 5,903,848 A | 5/1999 | Takahashi | |
| 5,920,854 A | 7/1999 | Kirsch et al. | |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

Perkowitz, Mike et al., "Utilizing Online Communities to Facilitate Physical World Interactions", *The International Conference on Communities and Technologies*, Sep. 19, 2003, Amsterdam, pp. 1-6.

(Continued)

*Primary Examiner* — Joseph E Avellino
*Assistant Examiner* — James Baron
(74) *Attorney, Agent, or Firm* — James J. DeCarlo; Greenberg Traurig, LLP

(57) ABSTRACT

The disclosure describes systems and methods delivering communications based on contextual addresses. An address string containing two or more identifiers, which may not be unique identifiers, and at least one conditional operator are provided as the address for a message or communication. The system identifies contextual relationships between a plurality of entities based on prior communications between the entities over the network. Based the contextual relationships, each identifier in the address string is disambiguated to identify one of the entities as a recipient and any associated delivery conditions controlling the delivery of the communication. The communication is then delivered to the identified recipient in accordance with the delivery condition.

20 Claims, 8 Drawing Sheets

(56) References Cited

U.S. PATENT DOCUMENTS

| | | | |
|---|---|---|---|
| 6,014,638 | A | 1/2000 | Burge et al. |
| 6,021,403 | A | 2/2000 | Horvitz et al. |
| 6,047,234 | A | 4/2000 | Cherveny et al. |
| 6,098,065 | A | 8/2000 | Skillen et al. |
| 6,112,181 | A | 8/2000 | Shear et al. |
| 6,157,924 | A | 12/2000 | Austin |
| 6,169,992 | B1 | 1/2001 | Beall et al. |
| 6,212,552 | B1* | 4/2001 | Biliris et al. .................. 709/206 |
| 6,266,667 | B1 | 7/2001 | Olsson |
| 6,314,365 | B1 | 11/2001 | Smith |
| 6,314,399 | B1 | 11/2001 | Deligne et al. |
| 6,324,519 | B1 | 11/2001 | Eldering |
| 6,327,590 | B1 | 12/2001 | Chidlovskii et al. |
| 6,446,065 | B1 | 9/2002 | Nishioka et al. |
| 6,490,698 | B1 | 12/2002 | Horvitz et al. |
| 6,502,033 | B1 | 12/2002 | Phuyal |
| 6,523,172 | B1 | 2/2003 | Martinez-Guerra et al. |
| 6,571,279 | B1 | 5/2003 | Herz et al. |
| 6,601,012 | B1 | 7/2003 | Horvitz et al. |
| 6,662,195 | B1 | 12/2003 | Langseth et al. |
| 6,665,640 | B1 | 12/2003 | Bennett et al. |
| 6,694,316 | B1 | 2/2004 | Langseth et al. |
| 6,701,311 | B2 | 3/2004 | Biebesheimer et al. |
| 6,701,315 | B1 | 3/2004 | Austin |
| 6,708,203 | B1 | 3/2004 | Makar et al. |
| 6,731,940 | B1 | 5/2004 | Nagendran |
| 6,741,980 | B1 | 5/2004 | Langseth et al. |
| 6,757,661 | B1 | 6/2004 | Blaser et al. |
| 6,773,344 | B1 | 8/2004 | Gabai et al. |
| 6,781,920 | B2 | 8/2004 | Bates et al. |
| 6,785,670 | B1 | 8/2004 | Chiang et al. |
| 6,789,073 | B1 | 9/2004 | Lunenfeld |
| 6,813,501 | B2 | 11/2004 | Kinnunen et al. |
| 6,816,850 | B2 | 11/2004 | Culliss |
| 6,829,333 | B1 | 12/2004 | Frazier |
| 6,834,195 | B2 | 12/2004 | Brandenberg et al. |
| 6,842,761 | B2 | 1/2005 | Diamond et al. |
| 6,845,370 | B2 | 1/2005 | Burkey et al. |
| 6,850,252 | B1 | 2/2005 | Hoffberg |
| 6,853,913 | B2 | 2/2005 | Cherveny et al. |
| 6,853,982 | B2 | 2/2005 | Smith et al. |
| 6,882,977 | B1 | 4/2005 | Miller |
| 6,904,160 | B2 | 6/2005 | Burgess |
| 6,931,254 | B1 | 8/2005 | Egner et al. |
| 6,961,660 | B2 | 11/2005 | Underbrink et al. |
| 6,961,731 | B2 | 11/2005 | Holbrook |
| 6,985,839 | B1 | 1/2006 | Motamedi et al. |
| 7,010,492 | B1 | 3/2006 | Bassett et al. |
| 7,027,801 | B1 | 4/2006 | Hall et al. |
| 7,058,508 | B2 | 6/2006 | Combs et al. |
| 7,058,626 | B1 | 6/2006 | Pan et al. |
| 7,062,510 | B1 | 6/2006 | Eldering |
| 7,065,345 | B2 | 6/2006 | Carlton et al. |
| 7,065,483 | B2 | 6/2006 | Decary et al. |
| 7,069,308 | B2 | 6/2006 | Abrams |
| 7,073,129 | B1 | 7/2006 | Robarts et al. |
| 7,110,776 | B2 | 9/2006 | Sambin |
| 7,143,091 | B2 | 11/2006 | Charnock et al. |
| 7,149,696 | B2 | 12/2006 | Shimizu et al. |
| 7,181,438 | B1 | 2/2007 | Szabo |
| 7,185,286 | B2 | 2/2007 | Zondervan et al. |
| 7,194,512 | B1 | 3/2007 | Creemer et al. |
| 7,203,597 | B2 | 4/2007 | Sato et al. |
| 7,209,915 | B1 | 4/2007 | Taboada et al. |
| 7,219,013 | B1 | 5/2007 | Young et al. |
| 7,236,969 | B1 | 6/2007 | Skillen et al. |
| 7,254,581 | B2 | 8/2007 | Johnson et al. |
| 7,257,570 | B2 | 8/2007 | Riise et al. |
| 7,305,445 | B2 | 12/2007 | Singh et al. |
| 7,320,025 | B1 | 1/2008 | Steinberg et al. |
| 7,343,364 | B2 | 3/2008 | Bram et al. |
| 7,395,507 | B2 | 7/2008 | Robarts et al. |
| 7,404,084 | B2 | 7/2008 | Fransdonk |
| 7,437,312 | B2 | 10/2008 | Bhatia et al. |
| 7,451,102 | B2 | 11/2008 | Nowak |
| 7,461,168 | B1 | 12/2008 | Wan |
| 7,496,548 | B1 | 2/2009 | Ershov |
| 7,522,995 | B2 | 4/2009 | Nortrup |
| 7,529,811 | B2 | 5/2009 | Thompson |
| 7,562,122 | B2* | 7/2009 | Oliver et al. .................. 709/206 |
| 7,577,665 | B2 | 8/2009 | Rameer et al. |
| 7,584,215 | B2 | 9/2009 | Saari et al. |
| 7,593,740 | B2* | 9/2009 | Crowley et al. ............ 455/456.3 |
| 7,624,104 | B2 | 11/2009 | Berkhin et al. |
| 7,624,146 | B1 | 11/2009 | Brogne et al. |
| 7,634,465 | B2 | 12/2009 | Sareen et al. |
| 7,657,907 | B2 | 2/2010 | Fennan et al. |
| 7,681,147 | B2 | 3/2010 | Richardson-Bunbury et al. |
| 7,725,492 | B2* | 5/2010 | Sittig et al. .................. 707/784 |
| 7,729,901 | B2 | 6/2010 | Richardson-Bunbury et al. |
| 7,769,740 | B2 | 8/2010 | Martinez et al. |
| 7,769,745 | B2 | 8/2010 | Naaman et al. |
| 7,783,622 | B1 | 8/2010 | Vandermolen et al. |
| 7,792,040 | B2 | 9/2010 | Nair |
| 7,802,724 | B1 | 9/2010 | Nohr |
| 7,822,871 | B2 | 10/2010 | Stolorz et al. |
| 7,831,586 | B2 | 11/2010 | Reitter et al. |
| 7,865,308 | B2 | 1/2011 | Athsani et al. |
| 7,925,708 | B2 | 4/2011 | Davis et al. |
| 2001/0013009 | A1 | 8/2001 | Greening et al. |
| 2001/0035880 | A1 | 11/2001 | Musatov et al. |
| 2001/0047384 | A1 | 11/2001 | Croy |
| 2001/0052058 | A1 | 12/2001 | Ohran |
| 2002/0014742 | A1 | 2/2002 | Conte et al. |
| 2002/0019849 | A1 | 2/2002 | Tuvey et al. |
| 2002/0019857 | A1 | 2/2002 | Harjanto |
| 2002/0023091 | A1 | 2/2002 | Silberberg et al. |
| 2002/0023230 | A1 | 2/2002 | Bolnick et al. |
| 2002/0035605 | A1 | 3/2002 | McDowell et al. |
| 2002/0049968 | A1 | 4/2002 | Wilson et al. |
| 2002/0052786 | A1 | 5/2002 | Kim et al. |
| 2002/0052875 | A1 | 5/2002 | Smith et al. |
| 2002/0054089 | A1 | 5/2002 | Nicholas et al. |
| 2002/0065844 | A1 | 5/2002 | Robinson et al. |
| 2002/0069218 | A1 | 6/2002 | Sull et al. |
| 2002/0099695 | A1 | 7/2002 | Abaijian et al. |
| 2002/0103870 | A1* | 8/2002 | Shouji .......................... 709/206 |
| 2002/0111956 | A1 | 8/2002 | Yeo et al. |
| 2002/0112035 | A1 | 8/2002 | Carey et al. |
| 2002/0133400 | A1 | 9/2002 | Terry et al. |
| 2002/0138331 | A1 | 9/2002 | Hosea et al. |
| 2002/0152267 | A1 | 10/2002 | Lennon |
| 2002/0169840 | A1 | 11/2002 | Sheldon et al. |
| 2002/0173971 | A1 | 11/2002 | Stirpe et al. |
| 2002/0178161 | A1* | 11/2002 | Brezin et al. .................... 707/10 |
| 2002/0198786 | A1 | 12/2002 | Tripp et al. |
| 2003/0008661 | A1 | 1/2003 | Joyce et al. |
| 2003/0009367 | A1 | 1/2003 | Morrison |
| 2003/0009495 | A1 | 1/2003 | Adjaoute |
| 2003/0027558 | A1 | 2/2003 | Eisinger |
| 2003/0032409 | A1 | 2/2003 | Hutcheson et al. |
| 2003/0033331 | A1 | 2/2003 | Sena et al. |
| 2003/0033394 | A1 | 2/2003 | Stine |
| 2003/0065762 | A1 | 4/2003 | Stolorz et al. |
| 2003/0069877 | A1 | 4/2003 | Grefenstette et al. |
| 2003/0069880 | A1 | 4/2003 | Harrison et al. |
| 2003/0078978 | A1 | 4/2003 | Lardin et al. |
| 2003/0080992 | A1 | 5/2003 | Haines |
| 2003/0126250 | A1* | 7/2003 | Jhanji .......................... 709/223 |
| 2003/0149574 | A1 | 8/2003 | Rudman |
| 2003/0154293 | A1 | 8/2003 | Zmolek |
| 2003/0165241 | A1 | 9/2003 | Fransdonk |
| 2003/0191816 | A1 | 10/2003 | Landress et al. |
| 2003/0200192 | A1* | 10/2003 | Bell et al. ........................ 707/1 |
| 2004/0010492 | A1 | 1/2004 | Zhao et al. |
| 2004/0015588 | A1 | 1/2004 | Cotte |
| 2004/0030798 | A1 | 2/2004 | Andersson et al. |
| 2004/0034752 | A1 | 2/2004 | Ohran |
| 2004/0043758 | A1 | 3/2004 | Sorvari et al. |
| 2004/0044736 | A1 | 3/2004 | Austin-Lane et al. |
| 2004/0070602 | A1 | 4/2004 | Kobuya et al. |
| 2004/0139025 | A1 | 7/2004 | Coleman |
| 2004/0139047 | A1 | 7/2004 | Rechsteiner |
| 2004/0148341 | A1 | 7/2004 | Cotte |

(56) References Cited

U.S. PATENT DOCUMENTS

| | | |
|---|---|---|
| 2004/0152477 A1* | 8/2004 | Wu et al. .................. 455/466 |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1* | 1/2005 | Sheldon et al. ............ 709/206 |
| 2005/0015599 A1 | 1/2005 | Wang et al. |
| 2005/0050027 A1 | 3/2005 | Yeh et al. |
| 2005/0050043 A1 | 3/2005 | Pyhalammi et al. |
| 2005/0055321 A1 | 3/2005 | Fratkina et al. |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0174975 A1* | 8/2005 | Mgrdechian et al. ......... 370/338 |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin et al. |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills et al. |
| 2006/0212330 A1 | 9/2006 | Savilampi |
| 2006/0212401 A1 | 9/2006 | Ameerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee et al. |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1* | 8/2007 | Zuckerberg et al. .............. 707/3 |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1* | 12/2007 | Altman et al. .................... 705/1 |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |

(56) References Cited

U.S. PATENT DOCUMENTS

| | | |
|---|---|---|
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0301250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1* | 2/2009 | Zimmet et al. ............... 709/204 |
| 2009/0044132 A1 | 2/2009 | Combel et al. |
| 2009/0063254 A1 | 3/2009 | Paul et al. |
| 2009/0070186 A1 | 3/2009 | Buiten et al. |
| 2009/0073191 A1 | 3/2009 | Smith et al. |
| 2009/0076889 A1* | 3/2009 | Jhanji .............................. 705/10 |
| 2009/0100052 A1 | 4/2009 | Stern et al. |
| 2009/0106356 A1 | 4/2009 | Brase et al. |
| 2009/0125517 A1 | 5/2009 | Krishnaswamy et al. |
| 2009/0132941 A1 | 5/2009 | Pilskalns et al. |
| 2009/0144141 A1 | 6/2009 | Dominowska et al. |
| 2009/0144392 A1* | 6/2009 | Wang et al. ................... 709/217 |
| 2009/0150501 A1* | 6/2009 | Davis et al. ................... 709/206 |
| 2009/0150507 A1 | 6/2009 | Davis et al. |
| 2009/0165051 A1 | 6/2009 | Armaly |
| 2009/0171939 A1 | 7/2009 | Athsani et al. |
| 2009/0177603 A1 | 7/2009 | Honisch |
| 2009/0187637 A1* | 7/2009 | Wu et al. ....................... 709/206 |
| 2009/0204484 A1 | 8/2009 | Johnson |
| 2009/0204672 A1 | 8/2009 | Jetha et al. |
| 2009/0204676 A1* | 8/2009 | Parkinson et al. ............ 709/206 |
| 2009/0216606 A1 | 8/2009 | Coffman et al. |
| 2009/0222302 A1 | 9/2009 | Higgins |
| 2009/0222303 A1 | 9/2009 | Higgins |
| 2009/0234814 A1 | 9/2009 | Boerries et al. |
| 2009/0234909 A1 | 9/2009 | Strandeil et al. |
| 2009/0249482 A1 | 10/2009 | Sarathy |
| 2009/0265431 A1* | 10/2009 | Jania et al. .................... 709/206 |
| 2009/0281997 A1 | 11/2009 | Jain |
| 2009/0299837 A1 | 12/2009 | Steelberg et al. |
| 2009/0313546 A1 | 12/2009 | Katpelly et al. |
| 2009/0320047 A1 | 12/2009 | Khan et al. |
| 2009/0323519 A1 | 12/2009 | Pun |
| 2009/0328087 A1 | 12/2009 | Higgins et al. |
| 2010/0002635 A1 | 1/2010 | Eklund |
| 2010/0014444 A1 | 1/2010 | Ghanadan et al. |
| 2010/0063993 A1 | 3/2010 | Higgins et al. |
| 2010/0070368 A1 | 3/2010 | Choi et al. |
| 2010/0118025 A1 | 5/2010 | Smith et al. |
| 2010/0125563 A1 | 5/2010 | Nair et al. |
| 2010/0125569 A1 | 5/2010 | Nair et al. |
| 2010/0125604 A1 | 5/2010 | Martinez et al. |
| 2010/0125605 A1 | 5/2010 | Nair et al. |
| 2010/0185642 A1 | 7/2010 | Higgins et al. |
| 2011/0004634 A1* | 1/2011 | Stremel et al. ................ 707/802 |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Sheppard, Brett, "The Rights Stuff: The Integration of Enterprise Digital Rights Management Into an Enterprise Architecture", *EContent*, vol. 29, No. 9, Nov. 2006, p. 38, 40-44, (pp. 1-7 of attached).

Voight, Joan et al., "Lessons for Today's Digital Market", Adweek. Com, Oct. 2, 2006, pp. 1-6.

"Reality Digital Debuts Opus", www.lightreading.com, Sep. 25, 2006, pp. 1.

U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/526,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.

Allen James F., "Maintaining Knowledge About Temporal Intervals", Communications of the ACM, Nov. 1983, vol. 26, No. 11 pp. 832-843; 12 pages.

Press Release, "QUALCOMM Conducts First Live Demonstration of FL Technology on a Wireless Handset", Qualcomm Inc., San Diego, Sep. 27, 2005; 3 pages.

MediaFlo, FLO Technology Overview, Qualcomm Inc. Copyright 2007; 24 pages.

Axup, Jeff et al., "Conceptualizing New Mobile Devices by Observing Gossip and Social Network Formation Amongst the Extremely Mobile", ITEE Technical Report #459, Dec. 19, 2005, pp. 1-71.

Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).

Davis, Marc et al., "From Context to Content: Leveraging Context to Infer Media Metadata", ACM Press, Oct. 10, 2004, pp. 1-8.

Kaasinen, E., "Behaviour & Information Technology", Taylor & Francis, vol. 24, No. 1, Jan./Feb. 2005, pp. 37-49, (Abstract only attached).

Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).

Lin, F. et al., "A unified framework for managing Web-based services.", Information Systems and e-Business Management, vol. 3, Oct. 2005, p. 299, (pp. 1-15 of attached).

Metz, Cade, "MySpace Nation", PC Magazine, Jun. 21, 2006, pp. 1-10 attached.

Perkowitz, Mike et al., "Utilizing Online Communities to Facilitate Physical World Interactions", The International Conference on Communities and Technologies, Sep. 19, 2003, Amsterdam, pp. 1 6.

Roush, Wade, "Social Machines", Continuous Computing Blog, Jul. 5, 2005, pp. 1-21.

Roush, Wade, "Social Machines", Technology Review, Aug. 2005, pp. 45-51.

Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).

Voight, Joan et al., "Lessons for Today's Digital Market", ADWEEKCOM, Oct. 2, 2006, pp. 1-6.

"Companies add new communication features to photo sharing.", Digital Imaging Digest, Feb. 2006, pp. 1-2.

"Dave.TV and Eye Music Network Empower Users to Create Their Own Music TV Channel on Their Sites With New IPTV Channel", www.davenw.com/2006, Sep. 13, 2006, pp. 1-2.

"Digital rights management: a primer: developing a user-friendly means of protecting content.(Profile)", Screen Digest, No. 420, p. 305, Sep. 2006, (pp. 1-9 of attached).

(56) References Cited

OTHER PUBLICATIONS

"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of Transmittal of the International Search Report and the Written Opinion of the International Search Authority, or Declaration (PCT/US2007/084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags. "Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; 3 pages.
"Technical White Paper: Choosing the best 2D barcode format for mobile apps", Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004) "From Context to Content: Leveraging Context to Infer Media Metadata," MM'04 New York, New York. 9 pages.
Davis. M. et al. "From Context to Context; Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification."10 pages.
Flickr. 'Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu .acil/Personal_sites/tarnirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, D. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In On the Move to Meaningful Internet Systems 2003: Coop/S, DOA, and Odbase R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
0' Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03' Berkeley: California. 12 pages.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.

(56) References Cited

OTHER PUBLICATIONS

U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Nedos, A; Singh K., Clarke S, "Proximity Based Group Communications for Mobile AD HOC Networks"; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Almieda, R.B. et al. "A Community-Aware Search Engine," WWW2004, New York., NY, May. 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artifical Intelligience, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent...>, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
Nedos, A; Singh K., Clarke S, Proximity Based Group Communications for Mobile AD HOC Networks', Proximity-Based Group Communication; Global Smart Spaces; D.14; Oct. 3, 2003; 31 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 11/593,668, filed Nov. 6, 2006, for Naaman, et al.
U.S. Appl. No. 11/593,869, filed Nov. 6, 2006, for Naaman, et al.
"Gutenkarte" Book Catalog, 2006 MetaCarta, Inc., www.gutenkarte.org 11 pgs.
Baron, N. S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >..., last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p. . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.

(56) References Cited

OTHER PUBLICATIONS

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (Date Unknown). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org," located at <http://wikimpaia.org/>, last visited on Mar. 3, 2008, one page.

\* cited by examiner

SYSTEM AND METHOD FOR CONTEXTUAL ADDRESSING OF COMMUNICATIONS ON A NETWORK

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information may be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY

This disclosure describes systems and methods for using data collected and stored by multiple devices on a network in order to improve the performance of the services provided via the network. In particular, the disclosure describes systems and methods delivering communications based on contextual addresses. An address string containing two or more identifiers, which may not be unique identifiers, and at least one conditional operator are provided as the address for a message or communication. The system identifies contextual relationships between a plurality of entities based on prior communications between the entities over the network. Based the contextual relationships, each identifier in the address string is disambiguated to identify one of the entities as a recipient and any associated delivery conditions controlling the delivery of the communication. The communication is then delivered to the identified recipient in accordance with the delivery condition.

One aspect of the disclosure is a method of transmitting information objects (IOs). The method includes receiving a request from a sender real-world entity (RWE) to deliver a first IO to a recipient RWE, wherein the request identifies the recipient RWE by providing an address string including at least a first non-unique descriptor, a second non-unique descriptor and a conditional operator identifying a relationship between the first and second non-unique descriptors. The method also includes accessing a plurality of second IOs, in which the second IOs include information associated with a plurality of RWEs including the recipient RWE. The method also selects the recipient RWE from the plurality of RWEs based on a comparison of the second IOs, the first non-unique descriptor and the second non-unique descriptor and transmits the first IO to the selected recipient RWE using a unique identifier associated with the recipient RWE.

Another aspect of the disclosure describes a computer-readable medium encoding instructions for performing a method of identifying a unique address for an RWE on a communication network. the method includes receiving a request from a sender RWF identifying a target RWE, wherein the request identifies the target RWE by providing an address string including a plurality of non-unique descriptors and one or more conditional operators identifying a relationship between two or more of the non-unique descriptors. The method further accesses a plurality of information objects (IOs), the IOs including information associated with RWEs on the network and generates a probability score for one or more of the RWEs based on the information in the IOs, the non-unique descriptors and the conditional operators. The method then selects the target RWE from the one or more RWEs based on the probability score and identifies a unique address associated the selected target RWE.

In yet another aspect, the disclosure describes a system for delivering IOs. The system includes one or more computing devices that include a correlation engine, computer-readable media, and an addressing engine. The correlation engine is connected via at least one communication channel to a plurality of computing devices transmitting information objects IOs over the at least one communication channel. The computer-readable media is connected to the correlation engine storing at least one of social data, spatial data, temporal data and logical data associated with a plurality of RWEs including the plurality of computing devices. The correlation engine, based on the detection of a request to deliver a first IO to an address string having at least a first entity identifier, a delivery condition descriptor and a conditional operator identifying a relationship between the first entity identifier and the delivery condition descriptor, further identifies one or more relationships between the first IO, the and the plurality of RWEs. The addressing engine generates a first probability for each combination of two of the plurality of RWEs based on the identified relationships and the address string, selects one of the plurality of RWEs as being identified by the first entity identifier based on the first probabilities generated, and associates the first IO with the selected one of the plurality of RWEs via associating a unique network identifier for the selected one of the plurality of RWEs with the first IO. The system may further include a delivery manager that retrieves a unique communication channel address for the selected one of the plurality of RWEs and transmits the first IO to the unique communication channel address, the unique communication channel address being different from the address string. The system may include an attribution engine that identifies an owner of the first IO from the data of the first IO, the owner being one of the plurality of RWEs, in which the addressing engine further generates the first probability for each of the plurality of RWEs based on relationships between the owner and the other RWEs stored in the computer-readable media.

Another aspect of the disclosure describes a method for delivering data that includes identifying relationships between a plurality of entities based on prior communications between the entities. The method then disambiguates, based the relationships, each identifier in an address string containing two or more identifiers and at least one conditional operator, thereby selecting a delivery condition and one of the entities as a recipient. The method then delivers data, such as a message or IO, associated with address string to the selected recipient in accordance with the delivery condition.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Figure 1:
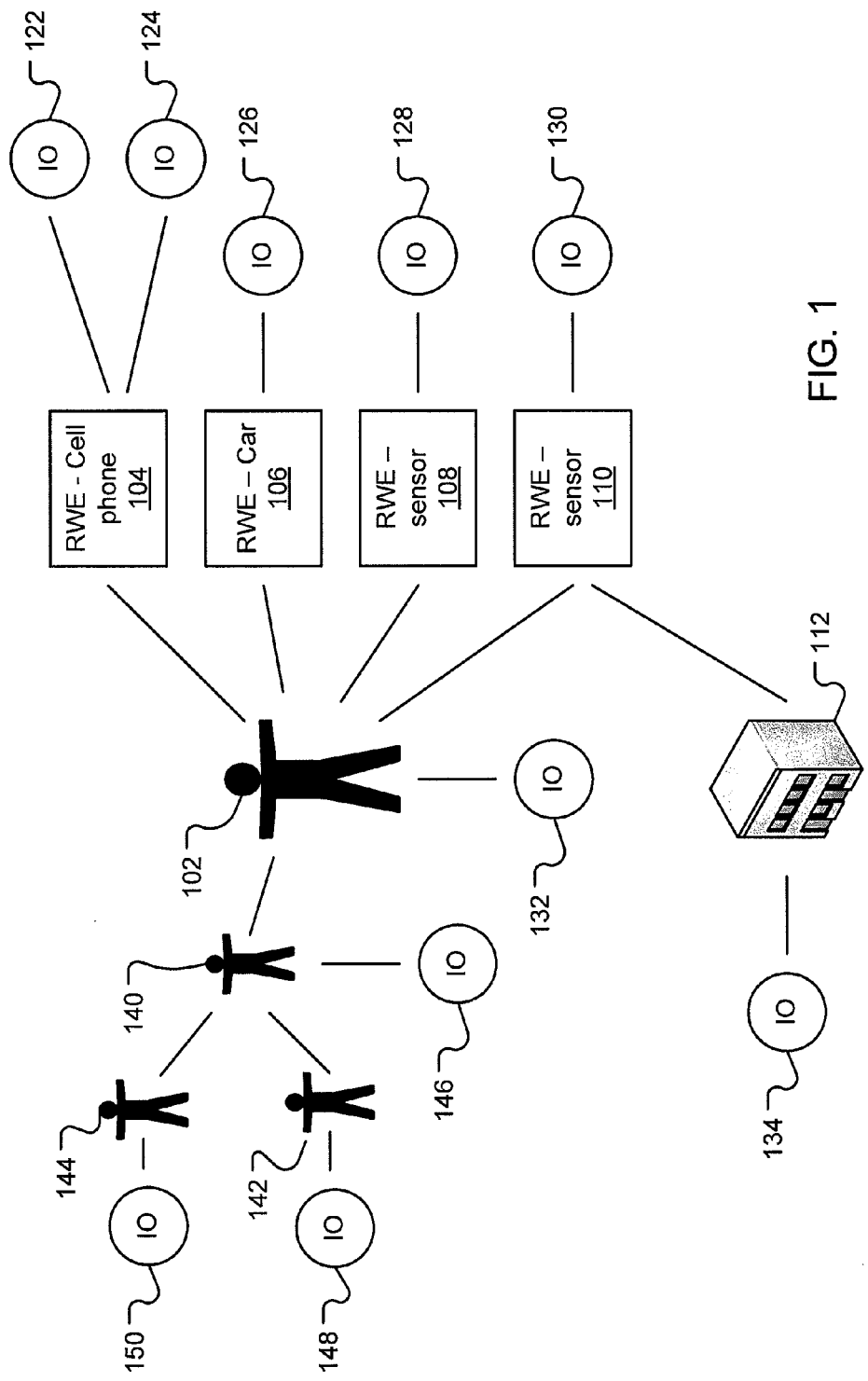
FIG. 1 illustrates an example of the relationships between RWEs and IOs on the W4 COMN.

This disclosure describes a communication network, referred herein as the "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built must first be introduced, real-world entities and information objects. These distinction are made in order to enable correlations to be made from which relationships between electronic/logical objects and real objects can be determined. A real-world entity (RWE) refers to a person, device, location, or other physical thing known to the W4 COMN. Each RWE known to the W4 COMN is assigned or otherwise provided with a unique W4 identification number that absolutely identifies the RWE within the W4 COMN.

RWEs may interact with the network directly or through proxies, which may themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that may be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations can not be considered separately from the physical device.

Examples of RWEs that must use proxies to interact with W4 COMN network include all non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that must use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) may be associated with any number and type of other RWEs including other people, cell phones, smart credit cards, personal data assistants, email and other communication service accounts, networked computers, smart appliances, set top boxes and receivers for cable television and other media services, and any other networked device. This association may be made explicitly by the user, such as when the RWE is installed into the W4 COMN. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association may include the user identifying a specific relationship between the user and the RWE (e.g., this is my device, this is my home appliance, this person is my friend/father/son/etc., this device is shared between me and other users, etc.). RWEs may also be implicitly associated with a user based on a current situation. For example, a weather sensor on the W4 COMN may be implicitly associated with a user based on information indicating that the user lives or is passing near the sensor's location.

An information object (IO), on the other hand, is a logical object that stores, maintains, generates, serves as a source for or otherwise provides data for use by RWEs and/or the W4 COMN. IOs are distinct from RWEs in that IOs represent data, whereas RWEs may create or consume data (often by creating or consuming IOs) during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that may further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs may or may not serve as a proxy for one or more RWEs. For example, voice communication software on a smart phone may serve as the proxy for both the smart phone and for the owner of the smart phone.

An IO in the W4 COMN may be provided a unique W4 identification number that absolutely identifies the IO within the W4 COMN. Although data in an IO may be revised by the act of an RWE, the IO remains a passive, logical data representation or data source and, thus, is not an RWE.

For every IO there are at least three classes of associated RWEs. The first is the RWE who owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the IO for some purpose.

"Available data" and "W4 data" means data that exists in an IO in some form somewhere or data that can be collected as needed from a known IO or RWE such as a deployed sensor. "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates an example of the relationships between RWEs and IOs on the W4 COMN. In the embodiment illustrated, a user 102 is a RWE of the network provided with a unique network ID. The user 102 is a human that communicates with the network via the proxy devices 104, 106, 108, 110 associated with the user 102, all of which are RWEs of the network and provided with their own unique network ID. Some of these proxies may communicate directly with the W4 COMN or may communicate with the W4 COMN via IOs such as applications executed on or by the device.

As mentioned above the proxy devices 104, 106, 108, 110 may be explicitly associated with the user 102. For example, one device 104 may be a smart phone connected by a cellular service provider to the network and another device 106 may be a smart vehicle that is connected to the network. Other devices may be implicitly associated with the user 102. For example, one device 108 may be a "dumb" weather sensor at a location matching the current location of the user's cell phone 104, and thus implicitly associated with the user 102 while the two RWEs 104, 108 are co-located. Another implicitly associated device IO may be a sensor IO for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor IO at that location 112), to be associated with the first user 102.

The user 102 may also be directly associated with other people, such as the person 140 shown, and then indirectly associated with other people 142, 144 through their associations as shown. Again, such associations may be explicit (e.g., the user 102 may have identified the associated person 140 as his/her father, or may have identified the person 140 as a member of the user's social network) or implicit (e.g., they share the same address).

Tracking the associations between people (and other RWEs as well) allows the creation of the concept of "intimacy": Intimacy being a measure of the degree of association between two people or RWEs. For example, each degree of removal between RWEs may be considered a lower level of intimacy, and assigned lower intimacy score. Intimacy may be based solely on explicit social data or may be expanded to include all W4 data including spatial data and temporal data.

Each RWE 102, 104, 106, 108, 110, 112, 140, 142, 144 of the W4 COMN may be associated with one or more IOs as shown. Continuing the examples discussed above, FIG. 1 illustrates two IOs 122, 124 as associated with the cell phone device 104. One IO 122 may be a passive data object such as an event record that is used by scheduling/calendaring software on the cell phone, a contact IO used by an address book application, a historical record of a transaction made using the device 104 or a copy of a message sent from the device 104. The other IO 124 may be an active software process or application that serves as the device's proxy to the W4 COMN by transmitting or receiving data via the W4 COMN. Voice communication software, scheduling/calendaring software, an address book application or a text messaging application are all examples of IOs that may communicate with other IOs and RWEs on the network. The IOs 122, 124 may be locally stored on the device 104 or stored remotely on some node or datastore accessible to the W4 COMN, such as a message server or cell phone service datacenter. The IO 126 associated with the vehicle 108 may be an electronic file containing the specifications and/or current status of the vehicle 108, such as make, model, identification number, current location, current speed, current condition, current owner, etc. The IO 128 associated with sensor 108 may identify the current state of the subject(s) monitored by the sensor 108, such as current weather or current traffic. The IO 130 associated with the cell phone 110 may be information in a database identifying recent calls or the amount of charges on the current bill.

Furthermore, those RWEs which can only interact with the W4 COMN through proxies, such as the people 102, 140, 142, 144, computing devices 104, 106 and location 112, may have one or more IOs 132, 134, 146, 148, 150 directly associated with them. An example includes IOs 132, 134 that contain contact and other RWE-specific information. For example, a person's IO 132, 146, 148, 150 may be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of a person's IO 132, 146, 148, 150 includes remote applications through which a person can communicate with the W4 COMN such as an account with a web-based email service such as Yahoo! Mail. The location's IO 134 may contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary. Metadata is loosely defined as data that describes data. For example, given an IO such as a music file, the core, primary or object data of the music file is the actual music data that is converted by a media player into audio that is heard by the listener. Metadata for the same music file may include data identifying the artist, song, etc., album art, and the format of the music data. This metadata may be stored as part of the music file or in one or more different IOs that are associated with the music file or both. In addition, W4 metadata for the same music file may include the owner of the music file and the rights the owner has in the music file. As another example, if the IO is a picture taken by an electronic camera, the picture may include in addition to the primary image data from which an image may be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
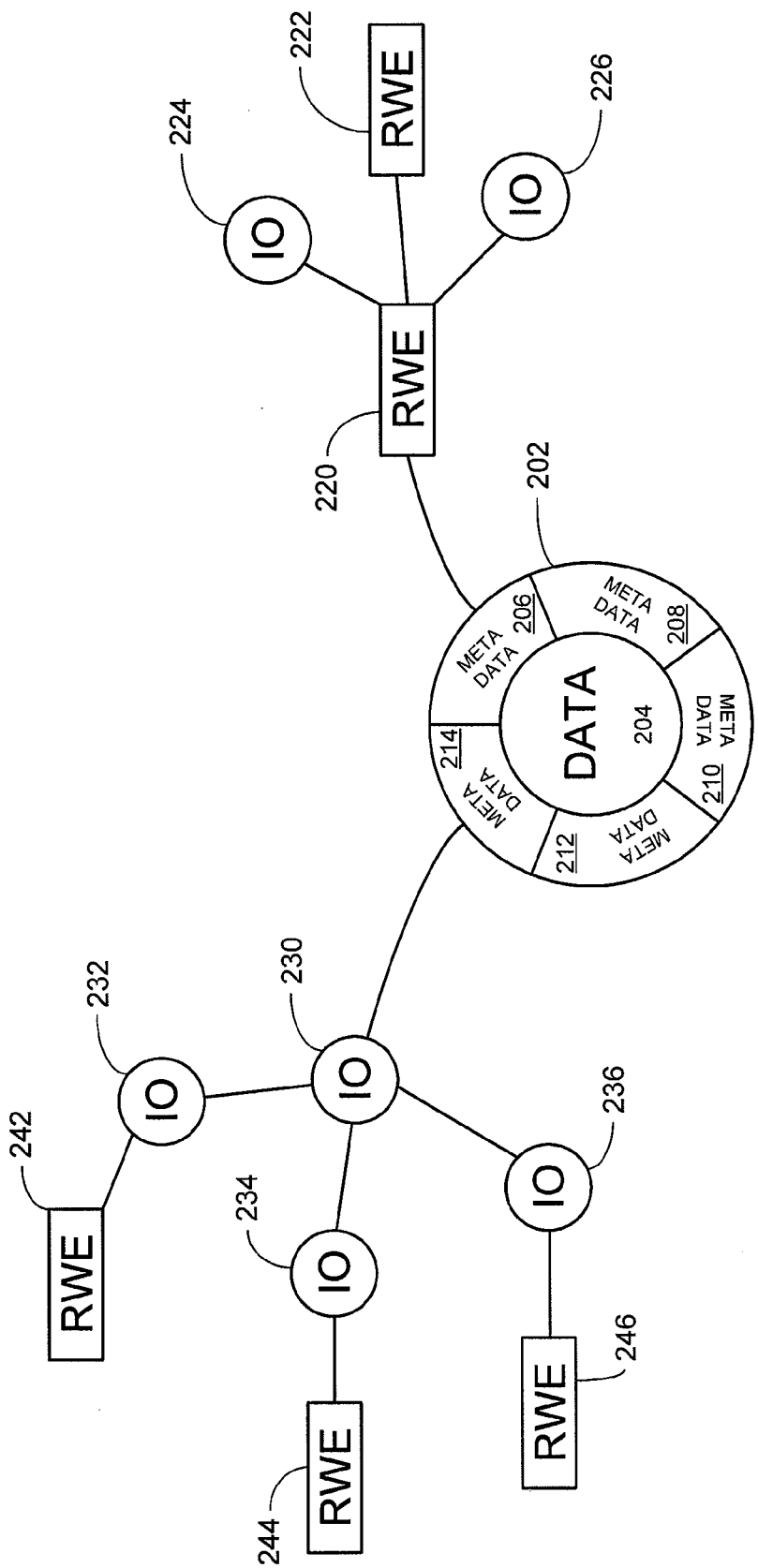
FIG. 2 illustrates an example of metadata defining the relationships between RWEs and IOs on the W4 COMN.

FIG. 2 illustrates an example of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 may contain information related only to the object data 204 and unrelated to any other IO or RWE. For example, a creation date, text or an image that is to be associated with the object data 204 of the IO 202.

Some of items of metadata 206, 214, on the other hand, may identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. This part of FIG. 2, for example, could describe the relations between a picture (IO 202) containing metadata 206 that identifies the electronic camera (the first RWE 220) and the user (the second RWE 224) that is known by the system to be the owner of the camera 220. Such ownership information may be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
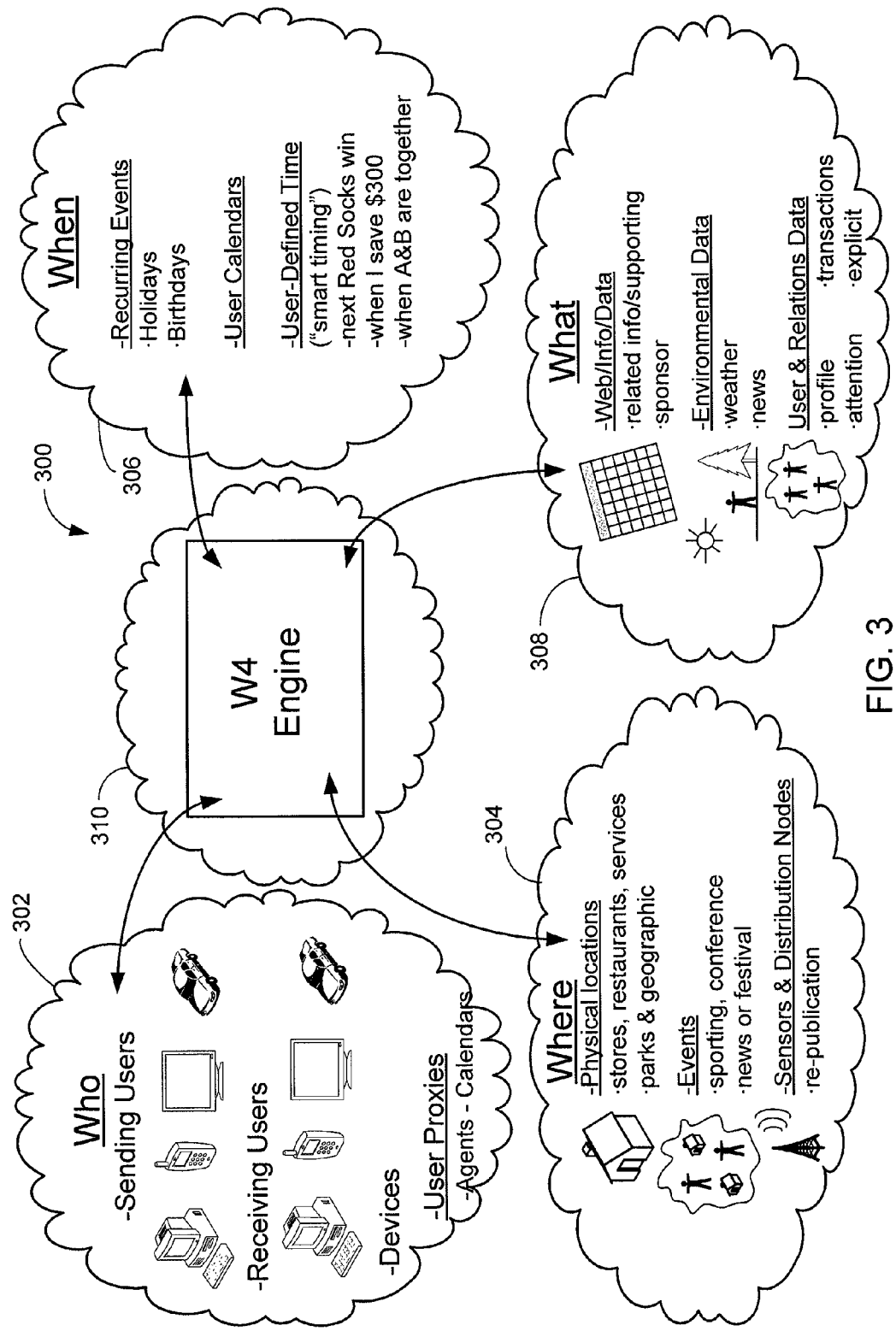
FIG. 3 illustrates a conceptual model of the W4 COMN.

FIG. 3 illustrates a conceptual model of the W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs). The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

As this is just a conceptual model, it should be noted that some entities, sensors or data will naturally exist in multiple clouds either disparate in time or simultaneously. Additionally, some IOs and RWEs may be composites in that they combine elements from one or more clouds. Such composites may be classified or not as appropriate to facilitate the determination of associations between RWEs and IOs. For example, an event consisting of a location and time could be equally classified within the When cloud 306, the What cloud 308 and/or the Where cloud 304.

The W4 engine 310 is center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). The W4 engine 310 controls all interactions between each layer of the W4 COMN and is responsible for executing any approved user or application objective enabled by W4 COMN operations or inter-operating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which may include storing copies of IOs and information identifying all RWEs and other information related to the IOs (e.g., who, what, when, where information). Other data collected by the W4 COMN may include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4

COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e., the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself, while in other embodiments, full access to the IO is possible and RWEs can thus also be extracted by analyzing the content of the object, e.g. strings within an email are extracted and associated as RWEs to for use in determining the relationships between the sender, user, topic or other RWE or IO impacted by the object or process.

In an embodiment, the W4 engine 310 represents a group of applications executing on one or more computing devices that are nodes of the W4 COMN. For the purposes of this disclosure, a computing device is a device that includes a processor and memory for storing data and executing software (e.g., applications) that perform the functions described. Computing devices may be provided with operating systems that allow the execution of software applications in order to manipulate data.

In the embodiment shown, the W4 engine 310 may be one or a group of distributed computing devices, such as a general-purpose personal computers (PCs) or purpose built server computers, connected to the W4 COMN by suitable communication hardware and/or software. Such computing devices may be a single device or a group of devices acting together. Computing devices may be provided with any number of program modules and data files stored in a local or remote mass storage device and local memory (e.g., RAM) of the computing device. For example, as mentioned above, a computing device may include an operating system suitable for controlling the operation of a networked computer, such as the WINDOWS XP or WINDOWS SERVER operating systems from MICROSOFT CORPORATION.

Some RWEs may also be computing devices such as smart phones, web-enabled appliances, PCs, laptop computers, and personal data assistants (PDAs). Computing devices may be connected to one or more communications networks such as the Internet, a publicly switched telephone network, a cellular telephone network, a satellite communication network, a wired communication network such as a cable television or private area network. Computing devices may be connected any such network via a wired data connection or wireless connection such as a wi-fi, a WiMAX (802.36), a Bluetooth or a cellular telephone connection.

Local data structures, including discrete IOs, may be stored on a mass storage device (not shown) that is connected to, or part of, any of the computing devices described herein including the W4 engine 310. For example, in an embodiment, the data backbone of the W4 COMN, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 4:
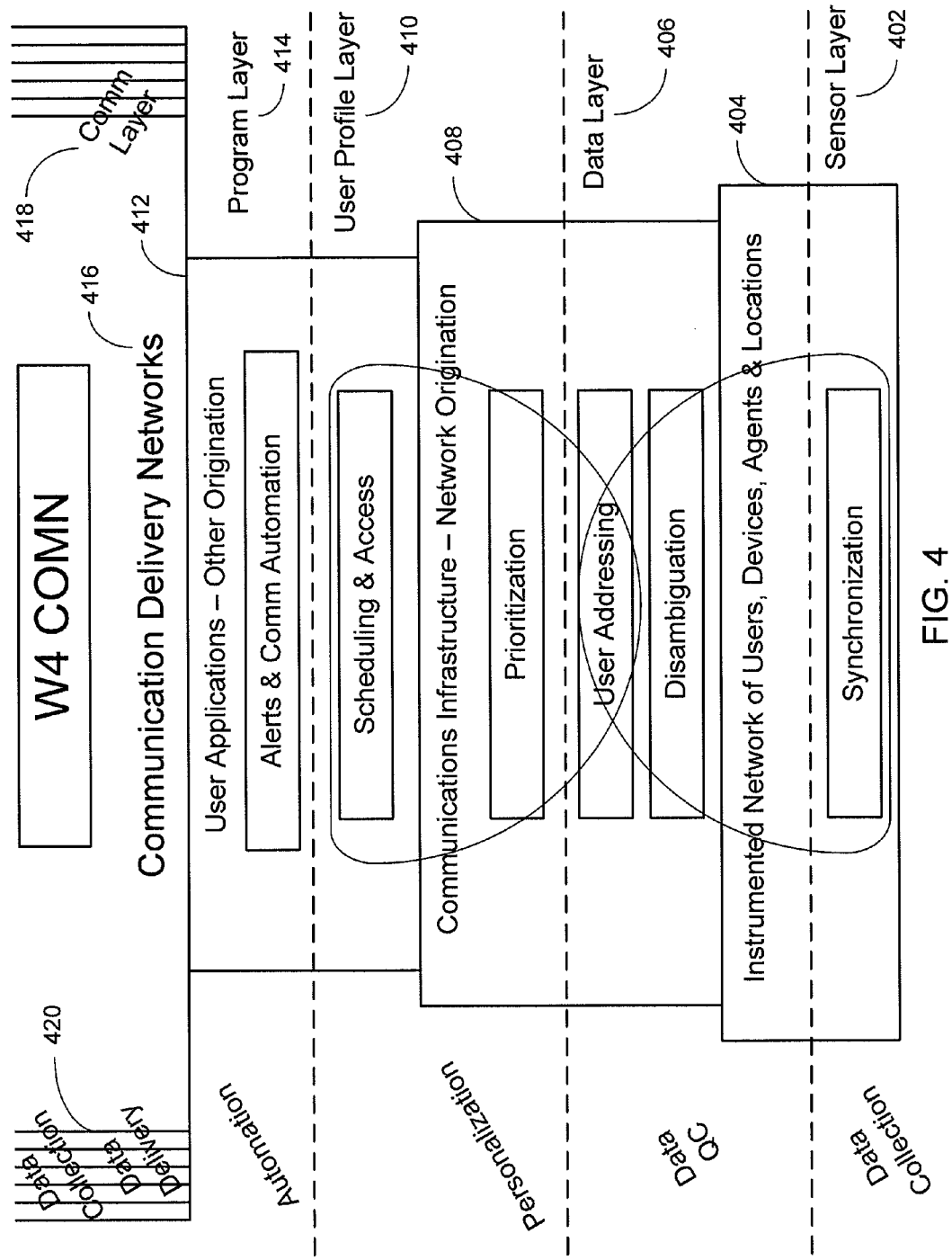
FIG. 4 illustrates the functional layers of the W4 COMN architecture.

FIG. 4 illustrates the functional layers of the W4 COMN architecture. At the lowest layer, referred to as the sensor layer 402, is the network 404 of the actual devices, users, nodes and other RWEs. The instrumentation of the network nodes to utilize them as sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The next layer is the data layer 406 in which the data produced by the sensor layer 402 is stored and cataloged. The data may be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The next layer of the W4 COMN is the user profiling layer 410. This layer 410 may further be distributed between the network infrastructure 408 and user applications/processes 412 executing on the W4 engine or disparate user computing devices. In the user profiling layer 410 that functions as W4 COMN's user profiling layer 410. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMN process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available to all processes of all applications approved on the W4 COMN. All Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from anything other than the network, e.g., RWEs such as users, locations, proxies and processes, come from the applications layer 414 of the W4 COMN. Some applications may be developed by the W4 COMN operator and appear to be implemented as part of the communications infrastructure 408, e.g. email or calendar programs because of how closely the operate with the sensor processing and user profiling layer 410. The applications 412 also serve some role as a sensor in that they, through their actions, generate data back to the data layer 406 via the data backbone concerning any data created or available due to the applications execution.

The applications layer 414 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices.)

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of it's regular intersection and sensing by enabled devices in it's real-world location.

Above the applications layer 414 (and sometimes hosted within it) is the communications delivery network(s) 416. This can be operated by the W4 COMN operator or be independent third-party carrier service, but in either case it functions to deliver the data via synchronous or asynchronous communication. In every case, the communication delivery network 414 will be sending or receiving data (e.g., http or IP packets) on behalf of a specific application or network infrastructure 408 request.

The communication delivery layer 418 also has elements that act as sensors including W4 entity extraction from telephone calls, emails, blogs, etc. as well as specific user commands within the delivery network context, e.g., "save and prioritize this call" said before end of call may trigger a recording of the previous conversation to be saved and for the W4 entities within the conversation to analyzed and increased in weighting prioritization decisions in the personalization/ user profiling layer 410.

Figure 5:
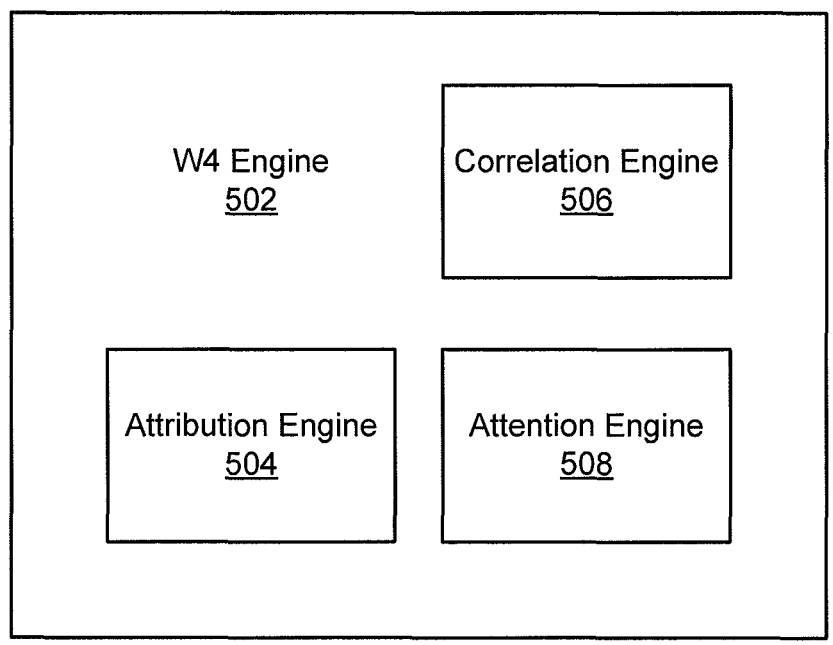
FIG. 5 illustrates an embodiment of analysis components of a W4 engine as shown in FIG. 2.

FIG. 5 illustrates an embodiment of analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is an attribution engine 504. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The W4 engine 502 further includes a correlation engine 506. The correlation engine 506 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data. In this embodiment, a histogram of all RWEs and IOs is created, from which correlations based on the graph may be made. Graphing, or the act of creating a histogram, is a computer science method of identify a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By selecting each IO, RWE, and other known parameters (e.g., times, dates, locations, etc.) as different bins and mapping the available data, relationships between RWEs, IOs and the other parameters can be identified.

As a pre-processor, the correlation engine 506 monitors the information provided by RWEs in order to determine if any conditions are identified that may trigger an action on the part of the W4 engine 502. For example, if a delivery condition has be associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
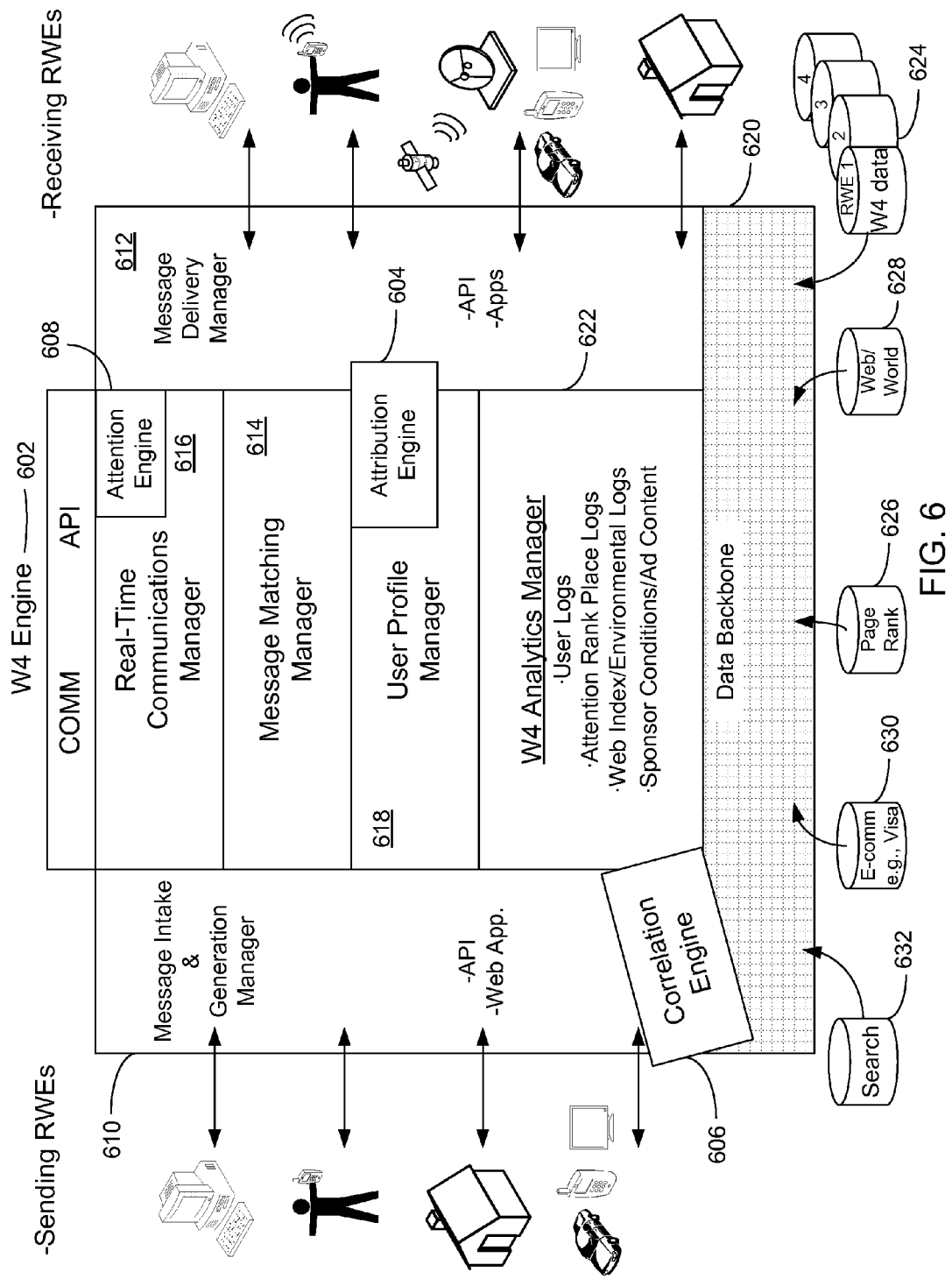
FIG. 6 illustrates an embodiment of a W4 engine showing different components within the sub-engines described generally above with reference to FIG. 5.

FIG. 6 illustrates an embodiment of a W4 engine showing different components within the sub-engines described generally above with reference to FIG. 4. In one embodiment the W4 engine 600 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622 and includes both aggregated and individualized archived versions of data from all network operations including user logs 624, attention rank place logs 626, web indices and environmental logs 628, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data. Spatial data may be any data identifying a location associated with an RWE. For example, the spatial data may include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data may be passively collected time data (e.g., time data from a clock resident on the electronic device, or time data from a network clock), or the temporal data may be actively collected time data, such as time data entered by the user of the electronic device (e.g., a user maintained calendar).

The interaction data may be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
| --- | --- | --- |
| Cell tower data | Time stamps | Interpersonal |
| GPRS data | Local clock | communication data |
| GPS data | Network clock | Media data |
| WiFi data | User input of | Relationship data |
| Personal area network data | time data | Transactional data |
| Network access points data | | Device interaction data |
| User input of location data | | |
| Geo-coordinates data | | |

With respect to the interaction data, communications between any RWEs may generate communication data that is transferred via the W4 COMN. For example, the communication data may be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data may be correlated with, for example, temporal data to deduce information regarding frequency of communications, including concentrated communication patterns, which may indicate user activity information.

Logical and IO data refers to the data contained by an IO as well as data associated with the IO such as creation time, owner, associated RWEs, when the IO was last accessed, etc. If the is a media object, the term media data may be used. Media data may include any data relating to presentable media, such as audio data, visual data, and audiovisual data. For example, the audio data may be data relating to downloaded music, such as genre, artist, album and the like, and includes data regarding ringtones, ringbacks, media purchased, playlists, and media shared, to name a few. The visual data may be data relating to images and/or text received by the electronic device (e.g., via the Internet or other network). The visual data may be data relating to images and/or text sent from and/or captured at the electronic device. The audiovisual data may be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data may include data relating to the user's RSS feeds, subscriptions, group memberships, game services, alerts, and the like. The media data also includes non-network activity, such as image capture and/or video capture using an electronic device, such as a mobile phone. The image data may include metadata added by the user, or other data associated with the image, such as, with respect to photos, location when the photos were taken, direction of the shot, content of the shot, and time of day, to name a few. As described in further detail below, media data may be used, for example, to deduce activities information or preferences information, such as cultural and/or buying preferences information.

The relationship data may include data relating to the relationships of an RWE or IO to another RWE or IO. For example, the relationship data may include user identity data, such as gender, age, race, name, social security number, photographs and other information associated with the user's identity. User identity information may also include e-mail addresses, login names and passwords. Relationship data may further include data identifying explicitly associated RWEs. For example, relationship data for a cell phone may indicate the user that owns the cell phone and the company that provides the service to the phone. As another example, relationship data for a smart car may identify the owner, a credit card associated with the owner for payment of electronic tolls, those users permitted to drive the car and the service station for the car.

Relationship data may also include social network data. Social network data includes data relating to any relationship that is explicitly defined by a user or other RWE, such as data relating to a user's friends, family, co-workers, business relations, and the like. Social network data may include, for example, data corresponding with a user-maintained electronic address book. Relationship data may be correlated with, for example, location data to deduce social network information, such as primary relationships (e.g., user-spouse, user-children and user-parent relationships) or other relationships (e.g., user-friends, user-co-worker, user-business associate relationships). Relationship data also may be utilized to deduce, for example, activities information.

The interaction data may also include transactional data. The transactional data may be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data may be utilized, for example, to deduce activities and preferences information. The transactional information may also be used to deduce types of devices and/or services the user owns and/or in which the user may have an interest.

The interaction data may also include device or other RWE interaction data. Such data includes both data generated by interactions between a user and a RWE on the W4 COMN and interactions between the RWE and the W4 COMN. RWE interaction data may be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data may be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Contextual Addressing Communications on the W4 COMN

One notable aspect of the W4 COMN is the ability to use the W4 data to allow users to use a more natural and intuitive addressing scheme when sending communications via a communication channel handled by the W4 COMN.

W4 contextual addressing is a network operation that allow completely personalized user-defined designations for RWEs and IOs, e.g., names or tags, by including the context of the address in address string. W4 contextual entity extraction is applied to addressing requests in order to map them to the appropriate channel, carrier and protocol based upon their relative positions within a series of more specific (intimate) social graph structures. This addressing scheme enables users to have non-unique identifiers for people search operations as well as provide people search systems that offer different results depending on who (and possibly where and when) does the search and the relationship between the searching party and the possible results. W4 contextual addressing is allowed by the centralized map of RWEs and IOs managed by the W4 engine, and provides a uniform comparative medium for all W4 COMN operations.

W4 contextual addressing allows personalized designations by users and processes for RWEs and IOs. Contextual addressing is enabled via the use of unique entity identifiers to identify all RWEs, including users (e.g., John Tomac), locations (e.g., latitude 38° 49' 54"N, Longitude 109° 45' 43"W), specific times (e.g., Wednesday, Oct. 31, 2007, 1:00 pm Mountain Time), business entities (Kona Bikes, Inc.) and topics (mountain biking, dinosaurs), based upon W4 data collected by the W4 COMN from prior interactions. Using the correlation engine, W4 data is used to model the relationships between IOs, their content and RWEs and then between the RWEs. These relationships are then used to lexically scope an address string and map it to its actual form(s) and protocol.

In contextual addressing, any form of address string could be used, but in a simple embodiment, a user would either say or type "any W4 Something" at (@) "any W4 Something" as an address for any form of communication on any communication channel. Based upon known or implied preferences, the W4 COMN, for example at the message intake manager, would parse the address string and extract identifiers and operator(s) from it. The W4 correlation engine then maps and disambiguates the identifiers to known RWEs or IOs. With the RWEs and IOs identified, the proper communication channel is identified and a channel-specific protocol can be retrieved and used as the address in place of the address string. The communication may then be delivered via the proper communication channel protocol.

For example, a mobile wireless W4 device-using user could say into the device's personal information manager application, "taxi at jfk". In response, the W4 engine would extract the strings "taxi" and "jfk" from his speech as different identifiers related by the conditional operator identifier "at", which are then mapped against the user's calendar entry of an upcoming trip to New York, and connect him live to a taxi company serving the John F. Kennedy Airport if the GPS or cell tower info reports the device's location as in John F. Kennedy Airport. Alternatively, if he was not physically in New York, it may look up the user's actual travel reservation and flight arrival times, search for preferred taxis and limos serving JFK Airport, send a text to the device saying "Taxis available by Baggage Claim Carousel 3, or a limo may be booked for pick up at same location. Book Y or N?"

In another example, a user could type into her W4 COMN-enabled email application as an address string "debby@projectblue". In response, the W4 engine would extract the strings "debby" and "projectblue" from the address string and a text analyzer would separate "project" and "blue" into two strings. Using W4 data of the user's recent email traffic would reveal that "project blue" is an internal code name (i.e., an identified topic) for upgrading company hardware and that a lot of email traffic has gone back and forth with a vendor's representative named Deborah Smith on this topic. A explicit relationship between Deborah Smith and the string "Debby" may be found in prior messages addressed to Deborah Smith's email address but starting with salutations containing "Debby" or an implicit relationship be found by consulting a list of proper name synonyms that associates Deborah and Debby. Further W4 extraction from meeting notes may find additional references to Deborah as Debby. In an embodiment, the W4 engine may return Deborah's actual email address to the device, which may replace it either in the actual editor (thus showing the actual address to the user) or once the send button has been hit.

Lexical scoping refers to the setting the scope of a variable within a context or sub-context. By defining the value of a given variable within the selected context in terms of it's W4 data model, it is possible to use W4 entities as the nodes in a logical network for addressing any person, place or topic with reference to known W4 information about the subject of the addressing request. Unlike alias systems currently known, this contextual addressing neither requires the same alias/address string to be used in every request, nor for any alias to be explicitly registered as an alias before using. Instead, non-unique identifiers can be used in natural ways that provide faster and freer communication because less (or no) time is spent worrying about, looking up and making sure the proper protocols are used in order to send a communication across a communication channel.

W4 contextual addressing also allows automatic and dynamic creation of groups of RWEs or IOs as the recipient or contextual limitation for any communications. For example, a coach could use "team@practice" to have a text message sent to all team member's cell phones at 4 pm when W4 extraction lets the W4 Engine know that practice is scheduled. "diet@team" could be used to only send to team members on a diet, or it could know that the content of the message addressed thusly is a low-fat recipe and so the W4 COMN could also add the recipe to the menu for team members on a diet if the coach had set up those communication preferences.

In the embodiments described above, the phrase "at" and symbol "@" are used to separate the identifiers in the address string. For the purposes of this disclosure, such phrases and symbols are referred to as conditional operators, or simply "conditionals". Any symbol may be used as long as the W4 COMN can recognize and understand the symbol. Conditional operators may serve multiple purposes in an address string. One purpose is to separate the different identifiers so that they can be parsed by the W4 COMN. Another purpose is define a contextual relationship between the two identifiers.

For example, in the above listed examples the phrase "at" and symbol "@" are used to denote that there must be a general association between the identifiers. In one aspect, the second identifier may then be considered a delivery condition that must be met before the communication is delivered to the entity identified by the first identifier. Note also, that in the embodiments described above, the second identifier also is used to lexically scope the first identifier and vice versa, so the conditional can be considered to require that there be an association between the two identifiers in addition to identifying a delivery condition.

In an embodiment of the addressing scheme, the first identifier may be considered the recipient and the second identifier (i.e., the identifier after the conditional) may be considered the delivery condition in the form of an RWE that must be associated with the recipient prior to delivery of the addressed communication. Thus, if the second identifier is determined to be a physical location, the addressed communication may not be delivered until such time as the W4 COMN determines that the recipient is at (i.e., within a pre-determined area near) the delivery condition location. If the second identifier is a topic, team, group or business entity, then the addressed communication may be delivered only to a recipient that is determined to be within that group based the relationships between potential recipients and the second identifier determined from the W4 data. If the second identifier is a time or an event (i.e., a location and time combination such as a scheduled meeting, game, concert, etc.), then the message may not be delivered until that temporal delivery condition (or the temporal and location condition if an event) is met.

An address string may also include multiple conditional operators and more than two identifiers or descriptors. For example, an address string may be "debby@projectblue@Thursday" which may be interpreted as a request to deliver the associated message to Deborah Smith associated with Project Blue on the next Thursday. Another example is "John@accounting@IBM", which may be determined to identify a specific RWE named John in the Accounting Department of IBM.

Figure 7:
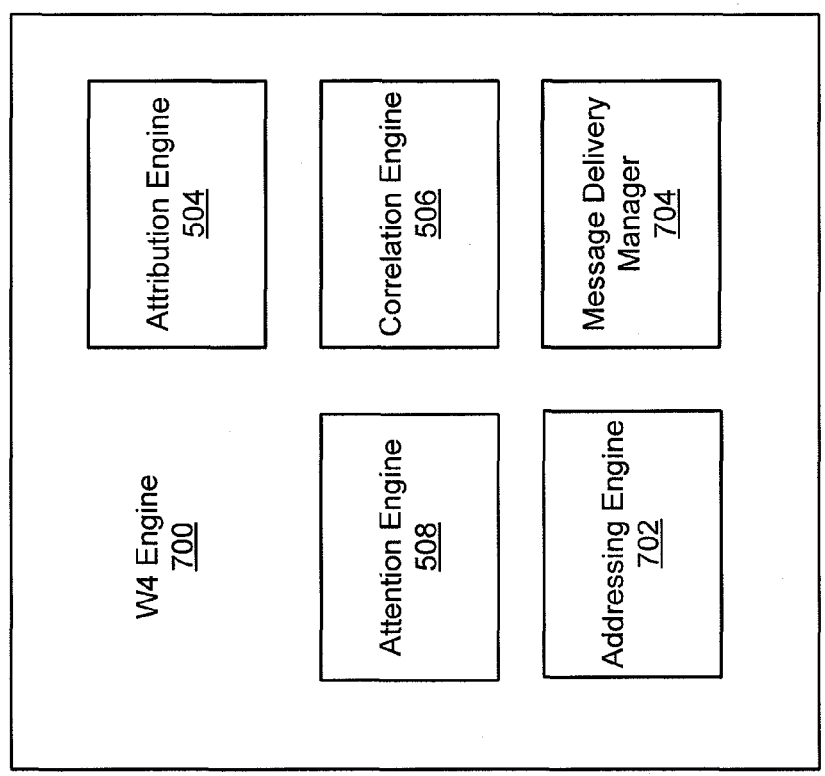
FIG. 7 illustrates elements of an embodiment of a W4 engine adapted to perform W4 addressing as described herein.

FIG. 7 illustrates elements of an embodiment of a W4 engine adapted to perform W4 addressing as described herein. The W4 engine 700 is adapted to receive address strings containing two or more entity identifiers or descriptors associated by at least one conditional operator as described above. In an embodiment, address strings such as "descriptor1@descriptor2" may be used. The W4 engine, using correlations made from W4 data, ultimately selects an RWE as the most likely RWE identified by each descriptor and then interprets the address in order to determine how the associated communication should be delivered.

The W4 engine 700 includes a correlation engine 506, an attribution engine 504 and an attention engine 508 as described above. In the embodiment shown, the correlation engine 506, based on the correlations between IOs and RWEs as described below, identifies relationships between the RWEs known to the W4 COMN. The relationships may be determined in response to a request to deliver a message, triggered by some other input, or may be automatically determined by the correlation engine on a periodic basis and stored for later real-time use.

In addition, the W4 engine 700 includes an addressing engine 702 that generates a probability for each of RWE and identifier combination as described in greater detail below. That is, for each RWE a probability is generated that describes probability that the RWE is the RWE that the sender of the communication meant to identify by the particular identifier. For example, for the address string "debby@projectblue", a first probability is determined for each RWE known to the system that that RWE is the "debby" and that that RWE is the "projectblue". A aggregate probability may then be determined for the address string as a whole based on the probabilities for each identifier.

The probabilities are determined from the relationships identified by the correlation engine 506 between RWEs by analyzing and mapping the W4 data. As the correlation engine 506 may identify many different relationships between the RWEs, for example one or more different location relationships, social relationships, topic relationships, etc., the probabilities may be determined by ascribing different weights to the different relationships based on a predetermination of their relative importance by relationship type and strength, or relative importance to a specific context or addressing request.

Based on the probabilities, a selection is made of the most likely RWE for each identifier in the string. Then a second analysis is performed to determine if the relationships between the selected RWEs are sufficiently strong to warrant delivery of the associated communication to the recipient identifier. For example, for the address string "debby@projectblue", if it is determined that there is a current, strong relationship between the RWE selected as most likely to be "debby" and the RWE most likely to be "projectblue" (e.g., debby is currently on Project Blue as a team member), then the communication may be delivered immediately.

Alternatively, if the second identifier is determined to be a delivery condition that has not occurred, e.g., it is an RWE that is a location, time or event, for which is there is not currently a strong relationship between the recipient and the delivery condition, the communication may be delayed until a strong relationship between the two entities is detected by the correlation engine. For example, for the address string "debby@grocerystore" if it is determined that there is not a current, strong relationship between the RWE selected as most likely to be "debby" and the RWE most likely to be "grocerystore" (e.g., Debby is not currently at or near Debby's usual grocery store), then the communication may not be delivered until the W4 COMN confirms that debby is at her local grocery store (e.g., by tracking the location of Debby's associated devices or by a report from geographic location sensor).

Once the RWEs are selected by the addressing engine, the communication is delivered, either immediately or upon detection that the delivery condition(s) have been met, by the message delivery manager 704. In an embodiment, the message delivery manager may also select a communication channel, and appropriate channel-specific address for the selected recipient, for delivery of the message. For example, an address string may be provided by voice command from a user into a smart phone connected to the W4 COMN. Using the information that the address string was provided by voice command, the message delivery manager 704 may interpret this as a request to initial a telephone conversation with the recipient, in which case the message delivery manager 704 may retrieve the telephone number for the selected recipient and initiate a call from the user's smart phone to the telephone number. Alternatively, the user may have entered the address string in an email, in which case the message delivery manager 704 may retrieve the email address for the selected recipient and transmit the message via email.

In addition, as RWEs may have multiple channel-specific addresses/identifiers (e.g., work email address, personal email address, work telephone number, personal telephone, work address, home address, etc.), the message delivery manager 704 may select the most appropriate address based on context of the address string and the relationships between the RWEs. For example, the address strings "debby@projectblue" and "debby grocerystore", even when used by the same sender, may result in messages being sent to two different addresses, possibly by two different communication channels and two different devices associated with "debby". The first string may result in an email being sent to Debby's work email address on her employer's email server (which is an RWE strongly associated with Debby and Project Blue based on prior emails). The second string may result in a text message being transmitted to Debby's cell phone or one of Debby's other mobile devices upon determination that that device is near a grocery store.

Selection of the delivery channel and appropriate address/identifier on that channel may be made by the delivery channel as described above based on information provided by the correlation engine 506. Alternatively, the delivery channel and address selection may be made by the addressing engine as part of the determination of the probabilities. In which case, the message delivery manager's primarily task may be only delivery of the message when/if the delivery condition is met.

Figure 8:
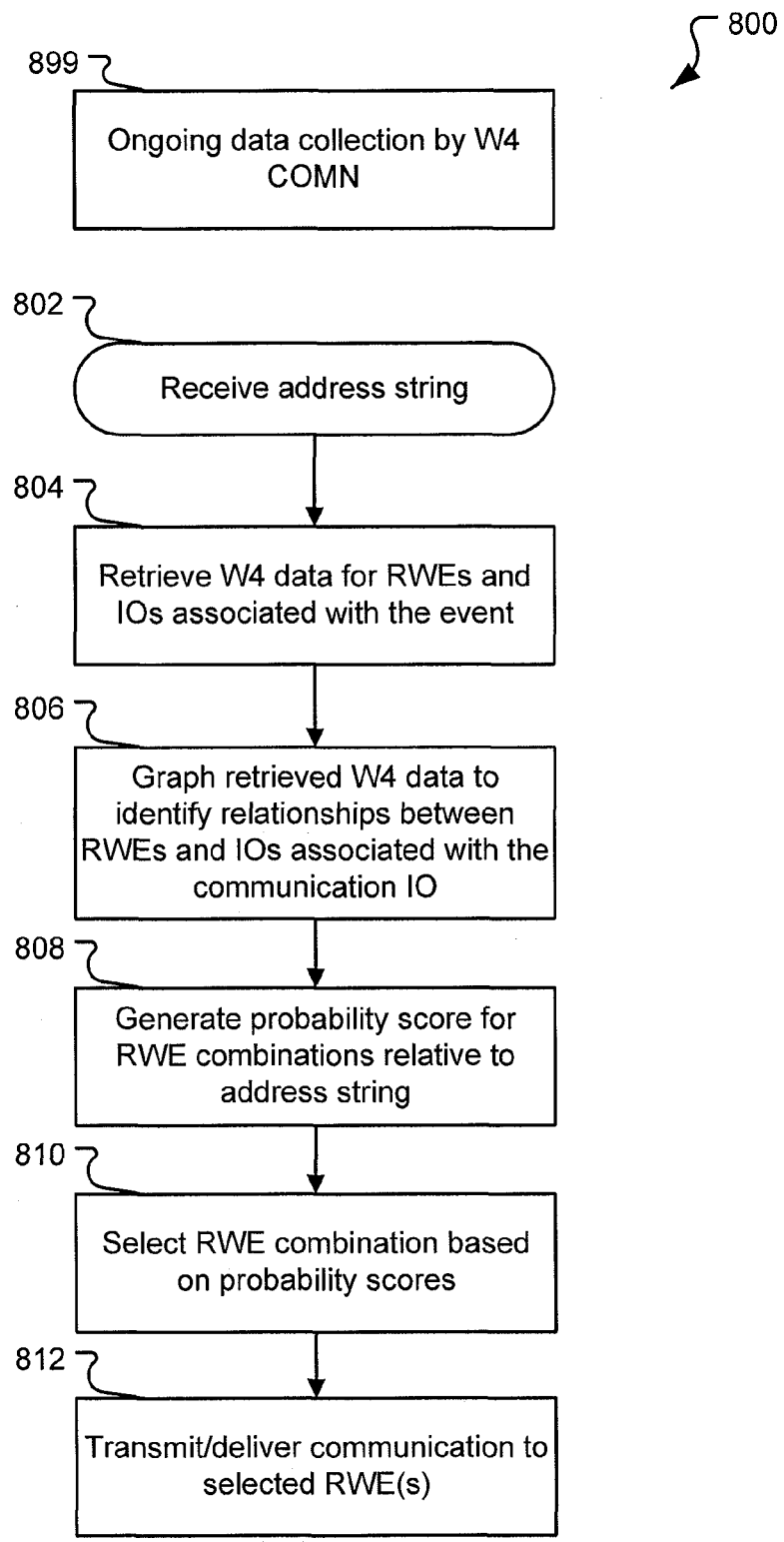
FIG. 8 illustrates an embodiment of a method for addressing, transmitting and delivering information objects over a network based on temporal, spatial and topical data for entities on the network.

FIG. 8 illustrates an embodiment of a method for addressing, transmitting and delivering information objects over a network based on temporal, spatial and topical data for entities on the network. In the embodiment described below, depending on how the architecture is implemented, the operations described may be performed by one or more of the various components, engines and managers described above. In addition, sub-engines may be created and used to perform specific operations in order to improve the network's performance as necessary.

As described above, a foundational aspect of the W4 COMN that allows for addressing in the manner described is the ongoing collection and maintenance of W4 data from the RWEs interacting with the network. In an embodiment, this collection and maintenance is an independent operation 899 of the W4 COMN and thus current W4 social, temporal, spatial and topical data are always available for use in addressing. In addition, part of this data collection operation 899 includes the determination of ownership and the association of different RWEs with different IOs as described above. Therefore, each IO is owned/controlled by at least one RWE with a known, unique identifier on the W4 COMN and each IO may have many other associations with other RWEs that are known to the W4 COMN.

In the embodiment shown, the method 800 is initiated when an address string is detected by the W4 COMN in a receive addressing request operation 802. Such a request may be generated by a software on a computing device operated by a user or by a "dumb" device such as a cellular phone or a sensor directed by a user. In an embodiment, the address string may be part of a communication request, such as a request to deliver a message, a request to initiate a telephone call or some other two-way communication link or a request to transmit data to a recipient. In such as situation, the address string is associated with the IO that is to be delivered and may also be a part of that IO. A request may also occur upon detection of an address string, such as for example, a user entering an address string into a field in an email composition screen or speaking an address string into a microphone on a device.

In the method 800, the address string, as described above, includes two or more identifiers separated by a conditional operator, such as "debby@projectblue". The identifiers may be unique channel-specific identifiers such as email addresses or telephone numbers, non-unique identifiers, aliases (i.e., predefined substitutes for a channel-specific identifier), or unique W4 identifiers. For the purposes of this disclosure, it is assumed that at least one, if not all, of the identifiers in the string are non-unique identifiers that cannot be simply resolved by the use of a lookup table or some other predetermined aliasing or forwarding method.

In the embodiment, the address string may be considered to be detected when it is received from an RWE or a process which will be referred to as the sender, although the reader will understand that the communication may not have actually been sent at the time of receipt of the address string. It is anticipated that under most circumstances that the sender will already be known to the W4 COMN and provided with a unique W4 identifier as well as at least one communication channel-specific address (which is another form of unique identifier). In addition, it should be noted that multiple RWEs may identified as senders of a single message, e.g., the computing device generating the message, the user of the computing device if known, and a business associated with the user and the computing device, etc.

As mentioned above, the receive address string operation 802 may include receiving an actual IO (e.g., message file or text) from an RWE or an IO such as a email software being executed by an RWE, the IO to be transmitted as directed by the address string. The IO may contain data such as the text or contents of the communication as well as additional information in the form of metadata. The data contained may be evaluated in order to identify additional RWEs associated with the communication as well as identifying a topic of the communication or resolving or verifying specific aliases connected with the data.

The receive address string operation 802 may also include an initial analysis of the address string and any IO data, if available, in order to identify such things as the topic of the event and identification other RWEs referred to in the communication (e.g., people listed in text of a message but that are neither the sender nor a recipient) or other IOs (e.g., hyperlinks to IOs, attachments, etc.) contained in the communication.

The receive address string operation 802 may be considered to occur at any point in the delivery chain within the W4 COMN, e.g., by any one of the engines used to conduct IO intake, routing or delivery. For example, depending on how the implementers of the W4 COMN choose to implement the network functions, an address string may be received and initially analyzed and information routed to the correlation engine and addressing engine by any one of the message intake and generation manager, user profile manager, message delivery manager or any other engine or manager in the W4 COMN's communication delivery chain.

In response to receiving the address string, a data retrieval operation 804 is performed. In the data retrieval operation 804, data associated with the sender and any other RWEs or IOs potentially related to the identifiers in the address string, e.g., locations, topics and specific pieces of equipment, are retrieved. In an embodiment, the data retrieval operation 804 further includes retrieval of additional W4 data up to all of the W4 data stored in order to perform the graphing operation 806 described below. The amount and extent of available data that is retrieved may be limited by filtering which RWE's and IO's data are retrieved. Such W4 data retrieved may include social data, spatial data, temporal data and logical data associated with each RWE. For example, data for past events related to a topic of the communication may be retrieved such as historical attendance of RWEs at such events. As discussed above, such W4 data may have been collected from communications and IOs previously obtained by the W4 COMN via many different communication channels and systems, including email and text-based communication channels as well as any communication channels that include audio data including channels that support telephone, voice over internet protocol (VOIP), and video communications.

For example, an IO may be emailed by a sender addressed to an address string. Because the sender can be resolved to existing RWEs using information known to the email communication network, the unique W4 identifiers for the sending IO (e.g., the email software), the computing device RWE executing the software or user account, and, possibly, the user RWE associated with that device or account may be determined. Using the unique W4 identifiers, then, the W4 COMN can identify and retrieve all W4 data associated with those sender entities, including information obtained from other communication channels. Thus, such W4 data as time and location data obtained from cellular telephone communications for each of the sender RWEs, social network information for the sender (e.g., who are listed as friends, co-workers, etc. for each of the sender on social network sites), project and organizational data (e.g., what position in an organizational chart and what association the sender has to a project and other employees) and what topics have been discussed when in previous communications.

The method 800 graphs the retrieved W4 data in a graphing operation 806. In an embodiment of the graphing operation 806, correlations are made for and between each of the RWEs known to the W4 COMN based on the social data, spatial data, temporal data and logical data associated with each RWE. In one sense, the graphing operation 806 may be considered a form of comparing the retrieved social data, spatial data, temporal data and logical data for each RWE with the retrieved data associated with the sender RWEs and RWEs that are potentially identified by the identifiers in the address string.

Thus, in an embodiment, the graphing operation 806 may be considered a set of independent operations in which each operation determines the relationships between a specified RWE and the other RWEs and the communication information. For example, a first graphing operation may be performed to determine the relationships between the sender, the communication data and other RWEs that may potentially be identified by the first identifier in the address string. A second graphing operation may be performed to determine the relationships between the sender, the communication data and other RWEs that may potentially be identified by the second identifier in the address string. Likewise, a third graphing operation may be performed assuming each RWEs is the recipient (i.e., is identified by the first identifier in the address string) to determine if there is a relationship between the RWE and the RWEs that may be identified by the second identifier. Such multiple graphing operations allow the differences in perspectives and relationships to be determined and subsequently used when generating probability score for the possible combinations of RWEs as the intended recipient/delivery conditions. Such mapping may include qualifying and normalizing requests across a company or predefined group of RWEs.

Based on the results of the graphing operation 806, a probability score for each possible combination of RWEs is generated in a probability score generation operation 808. In an embodiment, at a high level the probability score generation operation 808 may be considered an act of disambiguating each identifier in the address string to identify the exact RWE or a ranked set of likely RWEs for each identifier and then generating a probability score for RWE combinations (including interpretation of possible delivery conditions) based on the context of interrelationships of RWEs. The disambiguation of identifiers may include identifying, based on W4 data, and ranking (via probability scores) a set of RWEs for each identifier in the address string. Any suitable method or combination of methods of disambiguation may be used.

After disambiguating the identifiers to the extent possible, a probability score for the RWE/delivery condition combinations is then generated. For the purposes of this disclosure the term RWE combination includes combinations of RWEs and possible delivery conditions. For example, the W4 COMN may be able to disambiguate the address string "debby@projectblue" to identify both "debby" and "Projectblue" with certainty, and then, based on Debby's relationship with the RWE identified by "projectblue" different possible delivery conditions are evaluated and given different probability scores. If "projectblue" is determined to be a local restaurant that Debby has eaten at before and that is the extent of her relationship, then the RWE combination with the delivery condition of delivering the message to Debby (e.g., via an associated device such as Debby's cell phone) when it is detected that Debby is near the restaurant may be given a high probability score. Alternatively, if "projectblue" is determined to be Debby's employer or a topic that Debby is currently associated with, then the RWE combination with the delivery condition of delivering the message to Debby (via Debby's work email address or work phone) immediately may be given a high probability score. Both combinations may be evaluated and provided different probability scores in order to determine the relative likelihood of each delivery condition.

A probability score is a value representing the relative likelihood that a given RWE or combination of RWEs are the RWE or RWE combination actually intended by the sender that drafted the identifier or address string. In an embodiment, for each RWE known to the system a probability score may be generated for each identifier in the address string. In such a situation, the probability score for an RWE that are not related in any way to the sender, the topic or the identifiers from the address string will be very low if not a score of nil. Only RWEs with some known relationship (based on the mapping of the W4 data) to the sender, topic, identifiers or other communication data will have significant probability scores and the probability scores will reflect the number and strength of the relationships.

It should be noted that some relationships, such as those based on social data, those based on explicit associations (e.g., information identifying an RWE as my computer or my father), and those based on evidence of co-location may be considered more important and thus weighted more heavily when generating an aggregate probability score. By weighting the individual probability scores, the various relationships identified between the topic data, the temporal data and spatial data of different RWEs may be valued differently when aggregating them into a probability score. In order to obtain more accurate results, different relationships and different types (social, spatial, topical, temporal, etc.) of relationships may be assigned different weights when generating an aggregated probability score. For example, relationships based on spatial and temporal correlations may be assigned a greater relative weight than relationships based solely on social relationships. Likewise, relationships based on the relative frequency and topic of communications between two parties may be assigned a weight different from that accorded to a explicit designation that the two parties are friends, family members, etc. The probability score generated may take into account such W4 information known to the W4 COMN and allows the probability score to reflect W4 data received from different communication channels and associated with the different parties.

In an embodiment, the generation operation 808 independently generates a different probability score for each combination of RWEs for the address string. Each probability score is determined based on the relationships between those RWEs, the sender, the communication data, and the address string as determined based on their W4 data. As the address string may include a relationship dictated by the conditional operation, each RWE combination may be relationship specific in that the RWE combination RWE #1: RWE #2 may have a first probability score while the combination RWE #2:RWE #1 may have a different probability score for the same "identifier1@identifier2" address string.

The generation operation 808 may include generating, for each RWE, a set of probability scores (e.g., one for the sender, one for the identifier based on the similarity of the RWE's W4 data to the identifier, one for the topic, one for any other identifiable element associated with the communication, etc.) and then aggregating these probability scores to obtain a probability score describing the overall likelihood that the RWE is the RWE intended by the sender to be identified by a particular identifier in the address string. For example, a probability score that user A may be identified by a particular identifier may be an aggregation of a probability score of the sender to user A, of the topic to the user A, and the similarity of the particular identifier to information known about user A (e.g., the similarity between the identifier "debby", for instance, and the name of user A). The aggregated RWE probability score may then be used to generate address string probability scores for RWE combinations.

In an embodiment, for example, the generation operation 808 in order to determine a probability score for an RWE for a given identifier, each possible relationship between the identifier and the RWE is identified and given a probability score. This results in a set of probability scores, each describing the relationships between the RWE and the identifier in the W4 data. In addition, the relationship between an RWE and the topic is also identified and a probability score is generated to describe the importance of that relationship, as well. Other relationships may also be identified and a probability score generated for each.

In an embodiment, the generation operation 808 may also take into account information contained within the communication, including the identifiers, in that the probability score generated for each RWE will indicate a higher priority if the results of the graphing operation 806 show that the RWE has a strong relationship with the sender, topic, location, etc. The strength of a relationship may be determined by identifying how many previous communications or IOs have been transferred between or related to the parties. For example, if the topic of the communication is a person and an RWE has a strong relationship to that person (e.g., as indicated from previous communications with or about that person or based on information, such as social network information, that identifies some important social relationship with that person), then the probability score will be greater than that generated for a communication about a person to which the RWE has no known relationship.

In an embodiment, the value of the probability score for a particular RWE relative to an identifier or RWE combination relative to the address string may also be determined in part based on the relationship between the sender of the message and the RWE. This determination includes determining a relationship between the sender and the RWE(s) based on the retrieved social data, spatial data, temporal data and logical data for each. This relationship may be implicit and determined as a result of the correlations identified during the graphing operation 806. Alternatively, the relationships may be explicit, such as an employment or business organization relationship, and simply retrieved as part of the data retrieval operation 804.

Another factor in the generation of a probability score may be a temporal factor as determined by analysis of the temporal data associated with the communication. For example, if an identifier is a time or an event (as may be used as a delivery condition, for instance), the information may be compared to the current time and to the time of other events. This information may then be correlated with W4 data for the RWEs in order to determine if there is a relationship between RWEs and the time or event. The probability score of an RWE combination (in this case an RWE and time/event combination) may reflect the strength of the RWE's relationship with the time or event in the address string.

Yet another factor may be spatial. For example, if an identifier lists an RWE that is a location, e.g., a specific restaurant, the probability score generated for that RWE may be based on a disambiguation of the identifier to identify the restaurant. This information may result in a delivery condition based on proximity to the location and may also affect the selection of communication channel for the message associated with the address string (if any). For example, if a recipient has multiple mobile communication devices, the W4 addressing engine may direct that the message be delivered to the first of the recipient's devices that comes within the predetermined delivery distance from for that location.

As described above, in an embodiment the W4 COMN may generate, for each RWE known to the system, probability scores for some or all of the other RWEs, topics and RWE-topic combinations known to the W4 COMN. Such probability scores may be generated dynamically in response to new requests or the detection of a new address string. Alternatively, the W4 COMN may generate these probability scores periodically, e.g., every day or every few hours, as a standard procedure. In this case, the probability score generation operation 808 may be done independently and these probability scores may be retrieved as needed for the generation of each RWE's probability score for a particular identifier.

The correlation and comparison process to generate a probability score operation 808 can determine relationships between parties, topics, locations, etc. in part though the W4 COMN's identification of each RWE by a unique identifier and storage of information about the past interactions by those RWEs. The actual values obtained as probability scores by the generation operation 808 may vary depending on the calculations performed and weighting factors used. Any suitable method or algorithm for generating a value from different relationships identified in the data may be used. For example, all probabilities may be normalized to some scale or may be aggregated without normalization. This disclosure describes probability scores as "higher" to indicate that there is a higher likelihood that an RWE is identified or that there are relatively more and/or stronger relationships between the RWE and the other information associated with the address string in comparison with other RWEs. The reader will understand that other numerical scales, comparison mechanisms or systems may be used in order to compare the relationships in W4 data between RWEs in order to arrive at a relative ranking or probability based on those relationships.

In an embodiment, the W4 data are processed and analyzed using data models that treat data not as abstract signals stored in databases, but rather as IOs that represent RWEs that actually exist, have existed, or will exist in real space, real time, and are real people, objects, places, times, and/or events. As such, the data model for W4 IOs that represent W4 RWEs (Where/When/Who % What) will model not only the signals recorded from the RWEs or about the RWEs, but also represent these RWEs and their interactions in ways that model the affordances and constraints of entities and activities in the physical world. A notable aspect is the modeling of data about RWEs as embodied and situated in real world contexts so that the computation of similarity, clustering, distance, and inference take into account the states and actions of RWEs in the real world and the contexts and patterns of these states and actions.

For example, for temporal data the computation of temporal distance and similarity in a W4 data model cannot merely treat time as a linear function. The temporal distance and similarity between two times is dependent not only on the absolute linear temporal delta between them (e.g., the number of hours between "Tuesday, November 20, 4:00 pm Pacific Time" and "Tuesday, November 20, 7:00 pm Pacific Time"), but even more so is dependent on the context and activities that condition the significance of these times in the physical world and the other W4 RWEs (people, places, objects, and events) etc.) associated with them. For example, in terms of distance and similarity, "Tuesday, November 20, 4:00 pm Pacific Time" and "Tuesday, November 27, 4:00 pm Pacific Time" may be modeled as closer together in a W4 temporal data model than "Tuesday, November 20, 4:00 pm Pacific Time" and "Tuesday, November 20, 7:00 pm Pacific Time" because of the weekly meeting that happens every Tuesday at work at 4:00 pm vs. the dinner at home with family that happens at 7 pm on Tuesdays. Contextual and periodic patterns in time may be important to the modeling of temporal data in a W4 data model.

An even simpler temporal data modeling issue is to model the various periodic patterns of daily life such as day and night (and subperiods within them such as morning, noon, afternoon, evening, etc.) and the distinction between the workweek and the weekend. In addition, salient periods such as seasons of the year and salient events such as holidays also affect the modeling of temporal data to determine similarity and distance. Furthermore, the modeling of temporal data for IOs that represent RWEs should correlate temporal, spatial, and weather data to account for the physical condition of times at different points on the planet. Different latitudes have different amounts of daylight and even are opposite between the northern and southern hemispheres. Similar contextual and structural data modeling issues arise in modeling data from and about the RWEs for people, groups of people, objects, places, and events.

With appropriate data models for IOs that represent data from or about RWEs, a variety of machine learning techniques can be applied to analyze the W4 data. In an embodiment, W4 data may modeled as a "feature vector" in which the vector includes not only raw sensed data from or about W4 RWEs, but also higher order features that account for the contextual and periodic patterns of the states and action of W4 RWEs. Each of these features in the feature vector may have a numeric or symbolic value that can be compared for similarity to other numeric or symbolic values in a feature space. Each feature may also be modeled with an additional value from 0 to 1 (a certainty value) to represent the probability that the feature is true. By modeling W4 data about RWEs in ways that account for the affordances and constraints of their context and patterns in the physical world in features and higher order features with or without certainty values, this data (whether represented in feature vectors or by other data modeling techniques) can then be processed to determine similarity, difference, clustering, hierarchical and graph relationships, as well as inferential relationships among the features and feature vectors.

A wide variety of statistical and machine learning techniques can be applied to W4 data from simple histograms to Sparse Factor Analysis (SFA), Hidden Markov Models (HMMs), Support Vector Machines (SVMs), Bayesian Methods, etc. Such learning algorithms may be populated with data models that contain features and higher order features represent not just the "content" of the signals stored as IOs, e.g., the raw W4 data, but also model the contexts and patterns of the RWEs that exist, have existed, or will exist in the physical world from which these data have been captured.

Based on the probability scores generated for the RWE combinations from the relationships identified from the graphed W4 data, a selection of one or more RWE combinations is made in a selection operation 810. Depending on the scope of analyses performed in the probability score generation operation 808, the selection may be a simple operation of selecting the RWE or RWE(s) with the highest probability.

The selection operation 810 may include comparing the probability scores to a threshold and performing different actions depending on the results of the comparison. For example, in an embodiment two thresholds may be provided. A first threshold (or range of probability scores) may be provided for which, if a probability score is found to exceed the threshold, the method considers the associated RWE combination to be the RWE combination identified by the address string. If an RWE combination is found to have a probability score exceeding this threshold, the method 800 may automatically assume that the address string in this particular case identifies the RWE combination and the address string is treated by the system as if it had been addressed to unique, channel-specific identifier of the recipient RWE and delivered in accordance with the delivery condition as dictated by the RWE combination.

A second threshold (or range of probability score) may be identified by the W4 COMN for which, based on the algorithm used to generate the probability score, for which there is a likelihood that the associated RWE combination to be the RWE combination identified by the address string, but that likelihood is not so strong as warrant triggering automatic delivery of the message or replacement of the address string in accordance with the RWE combination. In such a situation, the W4 COMN may respond by prompting the sender of the communication with a question such as, "By 'debby@projectblue', do you mean the vendor's representative named Deborah Smith having an email at . . . ?" The prompt may include information derived from previous communications or other W4 data to assist the sender in confirming the proper identification of the recipient and delivery condition. This prompt may be transmitted instead of the error that would normally be sent by the communication channel.

In response, the sender may confirm an RWE combination identified in the prompt or provide more information to allow the system to further disambiguate the address string identifiers and generate new probability scores for the RWE combinations. Upon receiving a confirmation, the RWE combination is selected.

A third range of probability scores may be provided, e.g., probability scores that exceed neither the first nor the second threshold. If the probability scores for all RWE combinations determined in the generate probability operation 808 fall in this third range, the W4 COMN may do nothing reflecting a condition in which the W4 data contained insufficient information to allow a good correlation to be made. In this case, if the address string was in an address field for a communication, the W4 COMN may allow the error that would normally be sent by the communication channel to be sent or may prompt the user for more information as described above.

After a selection is made, different actions, some of which are already described above, may be taken by the W4 COMN. One such action is the association of a unique identifier with a non-unique identifier contained in the address string. Such an association may be made by replacing non-unique identifier with the unique identifier of the selected RWE. This may include overwriting the address string and/or other information in address and delivery fields of an IO.

Alternatively, the W4 COMN may also add the unique identifier of the selected RWE to the IO containing the non-unique identifier. Continuing an example from above, in the address string "debby@projectblue" the W4 COMN may attach as metadata the unique W4 identifier for the RWE selected as being identified by the identifier "debby". In addition, the unique W4 identifier, if there is one, for the topic/business/location determined to be "projectblue" may also be attached.

In addition, the W4 COMN may store information that serves to associate the non-unique identifier "debby" with the unique W4 identifier for the RWE having the name "Deborah Smith" in the W4 data backbone. Thus, one result of the addressing method is to create additional information that may then be used in subsequent correlations to better identify relationships between the RWEs. Such information will then be accessible as W4 data in later correlations. In this example, allowing the W4 COMN to easily identify the RWE having the name "Deborah Smith" as being the recipient of a message from the sender identified only by the non-unique identifier "debby" and the address string "debby@projectblue" and, thus, related to the sender and the RWE "projectblue" in a manner that will be identified in future graphing operations 806 and taken into account in future probability score generation operations 808. Thus, the addressing system learns and optimizes based on actual use.

The selections made by the method 800 described above will improve as the richness and amount of data are increased as the system collects more and more data. Furthermore, it should be noted that the method 800 is not an automatic way of creating an alias, but rather a method of dynamically associating non-unique identifiers in an address string based on contextual information in real time. Thus, what is determined to be the RWE for a given non-unique identifier "debby" in one context will not necessarily be the same RWE identified in a different context, even when the sender remains the same. For example, a particular sender may have two social circles, each with it's own "debby". In this case, the addressing method will be able to identify the correct RWE in each case, even though the sender and non-unique identifier are the same, by mapping the relationships of the different RWEs within the context of the communication.

The RWE combinations include different identifications of delivery conditions. For example, a non-unique identifier or descriptor in an address string may be identified as a time, location, predetermined event, business or other RWE as described above. In addition, a non-unique identifier or descriptor may be identified as a generic identifier for a service (e.g., taxi, flight, plane, rental car, limousine, dry cleaner, pest control service, plumber, attorney, physician, etc.). For example, any entry suitable for use as a category in a yellow pages directory may be identified as a generic identifier for RWEs offering the corresponding service. Thus, for the address string "taxi@jfk", an RWE that is taxi service with a taxi at or serving John F. Kennedy airport may be identified and the message delivered to that service.

In addition to selection of the recipient(s) and delivery conditions, the selection operation 810 includes selection of the communication channel via which the communication is delivered. For some address strings, the selected RWE combination will dictate the communication channel as described in examples provided above. Other address strings may allow for a message to be delivered to the recipient via multiple devices and communication channels. For such address strings, a selection is made for the recipient based on a ranking of devices and communication channels or, if available, in accordance with directions contained in the address string (e.g., "debby@projectblue.mobile" indicating that it should be delivered to a mobile device such as a cell phone or PDA).

If no explicit user direction is provided in the address string, the ranking may be based on the type of communication associated with the address string. For example, if the communication is a voice communication initiated by a spoken address string, the selection operation 810 may rank a telephone communication channel to a mobile device first, followed by telephone communication channel to a home telephone number for the recipient, further followed by a VOIP communication channel to a non-mobile computing device associated with the recipient. If the message is a text message, the first communication channel selected may be an SMS communication channel to a mobile device or IM, followed by an email communication channel to an email account associated with the recipient such that the message may be ultimately delivered to the same mobile device more than once.

After the selection operation 810, a delivery operation 812 is performed in which the communication associated with the address string is transmitted to the selected recipient(s) in accordance with the identified delivery conditions. The delivery operation 812 may take the form of opening a voice or video data connection between the sender's device and a device associated with the recipient. Alternatively, the delivery operation 812 may take the form of transmitting a message in the form of an IO or other data from the sender's device to a device associated with the recipient.

If a delivery condition is determined that indicates a communication should be delivered immediately, then the transmission will occur without delay. However, if a delivery condition has been determined that indicates some thing must first occur before the communication should be delivered, then the delivery operation 812 will monitor the W4 data associated with the delivery condition (e.g., the location of the recipient, the time, etc.) until the condition is met and then deliver the communication.

The delivery operation 812 may include retrieving a unique channel specific-identifier (e.g., a telephone number, an email address, etc.) for the communication channel and device selected for delivery of the message. Such a unique channel specific-identifier may be selected from the group of unique channel specific-identifiers for devices, accounts, etc. associated with the identified recipient based on the unique W4 identifier of the recipient and the device RWEs associated with the recipient in the W4 data.

The W4 addressing method described above may be used to address and deliver messages in a different way than is currently possible. For example, returning to the who, what, when, where categorizations as described above, messages may be addressed to a "who@where" such as the "debby@projectblue" example. Communications may also be addressed to a "who@who" such as "wendy@john" to indicate a Wendy that is associated (e.g., wife, girlfriend, roommate, daughter, etc.) with a John known to the sender. Communications may also be addressed to a "who where" such as "george@moab" to delivery a message to a George known to the sender when the W4 COMN determines that George is in Moab, Utah or a "who@when" indicating a future time delivery condition. Other possible addresses may include those addressed to a "where@where" and to a "what@where" (e.g., a business at a location), to a "who@what" (e.g., a recipient at a web page or accessing an IO). In the addressing scheme described, nearly any combination of RWEs and delivery conditions are possible, especially when larger address strings are considered (e.g., "john@bar@birthday", "shelley@shoestore@birthday", "mike@worldseriesgame4@cubswin" and "bill@rockiesstadium@gameday@restroom").

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, the prompting that occurs in the addressing method allows a user to use the W4 addressing method as a type of search system that returns a listing of one more services with strong relationships to the user based on the user's and services' W4 data. For example, address strings such as "pizza@santacruz" and "hotel@lax" may be used to cause the W4 COMN to provide listings of service providers that may have some relationship with the user and instantly open communications with them Numerous other changes may be made that will readily suggest themselves to those skilled in the art and which are encompassed in the spirit of the invention disclosed and as defined in the appended claims.

What is claimed is:

1. A method comprising:
receiving, at a computing device, a request from a sender real-world entity (RWE) to deliver a first IO to a recipient RWE, such that the request identifies the recipient RWE by providing an address string including at least a first non-unique descriptor, a second non-unique descriptor and a conditional operator identifying a relationship between the first and second non-unique descriptors;
retrieving, via a network, social data, spatial data, temporal data and logical data available to the network associated with the sender RWE, a plurality of other RWEs and a plurality of IOs potentially related to the descriptors in the address string;
graphing, using the computing device, the social data, spatial data, temporal data and logical data to identify relationships between the sender RWE, the first IO, each RWE of the plurality of other RWEs and each IO of the plurality of IOs potentially related to the descriptors in the address string, the graphing comprising creating a combined graph of combinations of RWEs and IOs to which the social data, spatial data, temporal data and logical data relate;
selecting, via the computing device, the recipient RWE from the plurality of other RWEs based on the results of the graphing operation;

identifying, at the computing device, a delivery condition in the address string;

determining, at the computing device, the delivery condition is met by monitoring social data, spatial data, temporal data and logical data available to the network related to the delivery condition; and in response to determining the delivery condition is met, transmitting, over the network, the first IO to the selected recipient RWE using a unique identifier associated with the recipient RWE.

2. The method of claim 1, such that selecting further comprises:

identifying, based on the results of the graphing operation, a first plurality of identified RWEs comprising at least a subset of the plurality of other RWEs identified by the first non-unique descriptor;

identifying, based on the results of the graphing operation, a second plurality of identified RWEs comprising at least a subset of the plurality of other RWEs identified by the second non-unique descriptor and the delivery condition;

generating, based on the results of the graphing operation, a respective probability score for each combination of a respective one of the first plurality of identified RWEs and a respective one of the second plurality of identified RWEs;

selecting one of the combinations based on the respective probability score of the respective combination; and selecting the recipient RWE from the RWEs in the selected combination based on the conditional operator.

3. The method of claim 1 further comprising:

retrieving the unique identifier for the recipient RWE from a set of unique identifiers associated with the recipient RWE.

4. The method of claim 3, such that each unique identifier in the set of unique identifiers is associated with a respective one of a plurality of channels and the method further comprises:

selecting, based on the request, a selected one of the plurality of communication channels for transmitting the first IO to the recipient RWE; and selecting the unique identifier for the recipient RWE associated with the selected one of the plurality of communication channels.

5. The method of claim 1 further comprising:

identifying, based on the results of the graphing operation, a plurality of identified RWEs comprising at least a subset of the plurality of other RWEs identified by the first non-unique descriptor;

generating a respective probability score for each RWE of the plurality of identified RWEs based on the results of the graphing operation;

selecting the recipient RWE from the plurality of identified RWEs based on probability scores.

6. The method of claim 1 further comprising:

identifying the first non-unique descriptor as a generic identifier for a service; and selecting the recipient RWE from a list of third RWEs associated with the service.

7. A non-transitory computer-readable storage medium tangibly encoding instructions, which when executed by a computer, perform a method:

receiving, at a computing device, a request from a sender real-world entity (RWE) to deliver a first IO to a recipient RWE, such that the request identifies the recipient RWE by providing an address string including at least a first non-unique descriptor, a second non-unique descriptor and a conditional operator identifying a relationship between the first and second non-unique descriptors;

retrieving, via a network, social data, spatial data, temporal data and logical data available to the network associated with the sender RWE, a plurality of other RWEs and a plurality of IOs potentially related to the descriptors in the address string;

graphing, using the computing device, the social data, spatial data, temporal data and logical data to identify relationships between the sender RWE, the first IO, each RWE of the plurality of other RWEs and each IO of the plurality of IOs potentially related to the descriptors in the address string, the graphing comprising creating a combined graph of combinations of RWEs and IOs to which the social data, spatial data, temporal data and logical data relate;

selecting, via the computing device, the recipient RWE from the plurality of other RWEs based on the results of the graphing operation;

identifying, at the computing device, a delivery condition in the address string;

determining, at the computing device, the delivery condition is met by monitoring social data, spatial data, temporal data and logical data available to the network related to the delivery condition; and in response to determining the delivery condition is met, transmitting, over the network, the first IO to the selected recipient RWE using a unique identifier associated with the recipient RWE.

8. The non-transitory computer-readable storage medium of claim 7, such that selecting further comprises:

transmitting information associated with the selected target RWE to the sender RWE; and receiving confirmation from the sender RWE that the selected target RWE is the target RWE identified by the request.

9. The non-transitory computer-readable storage medium of claim 7, such that the method further comprises:

searching each IO of the plurality of IOs for data that relates to each non-unique descriptor of the plurality of non-unique descriptors;

for each IO of the plurality of IOs having data that relates to one or more non-unique descriptors of the plurality of non-unique descriptors, identifying a respective RWE of the plurality of RWEs on the network associated with the respective IO and an association context describing a relationship between the identified RWE and the one or more non-unique descriptors of the plurality of non-unique descriptors; and generating the probability score for each RWE of one or more of the plurality of RWEs on the network based on the association contexts identified for the respective RWE.

10. The non-transitory computer-readable storage medium of claim 9, such that generating a probability score further comprises:

for each RWE of the plurality of RWEs on the network associated with a non-unique descriptor by one or more IOs of the plurality of IOs, generating a descriptor-specific probability score for the respective RWE based on the association contexts, the descriptor-specific probability score describing a probability that the non-unique descriptor refers to the respective RWE; and generating, for each RWE of one or more of the of the plurality of RWEs on the network, an overall probability score based on the descriptor-specific probability scores, the overall probability score describing a probability that the address string identifies the respective RWE.

11. The method of claim 1, such that combined graph comprises a histogram.

12. The method of claim 1, such that the social data, spatial data, temporal data and logical data comprise a feature vector comprising raw sensed data relating to RWEs and contextual and periodic patterns of the states and action of RWEs.

13. The method of claim 12, such that graphing comprise processing the feature vector to determine similarity, difference, clustering, hierarchical and graph and inferential relationships between RWEs to which the social data, spatial data, temporal data and logical data relate.

14. The method of claim 1, such that graphing operation comprises:
graphing, using the computing device, the social data, spatial data, temporal data and logical data to identify relationships between the sender RWE, the plurality of other RWEs and the plurality of IOs, the graphing comprising creating a combined graph of combinations of RWEs and IOs to which the social data, spatial data, temporal data and logical data relate;
a first graphing operation to determine the relationships between the sender RWE, the first IO and other RWEs potentially identified by the first identifier in the address string;
a second graphing to determine the relationships between the sender RWE, the first IO and other RWEs potentially be identified by the second identifier in the address string; and
a third graphing operation to determine relationships between the other RWEs potentially identified by the first identifier in the address string and other RWEs potentially be identified by the second identifier in the address string.

15. A computing device comprising:
a processor;
a storage medium for tangibly storing thereon program logic for execution by the processor, the program logic comprising:
logic executed by the processor for receiving a request from a sender real-world entity (RWE) to deliver a first IO to a recipient RWE, such that the request identifies the recipient RWE by providing an address string including at least a first non-unique descriptor, a second non-unique descriptor and a conditional operator identifying a relationship between the first and second non-unique descriptors;
logic executed by the processor for retrieving, via a network, social data, spatial data, temporal data and logical data available to the network associated with the sender RWE, a plurality of other RWEs and a plurality of IOs potentially related to the descriptors in the address string;
logic executed by the processor for graphing the social data, spatial data, temporal data and logical data to identify relationships between the sender RWE, the first IO, each RWE of the plurality of other RWEs and each IO of the plurality of IOs potentially related to the descriptors in the address string, the graphing comprising creating a combined graph of combinations of RWEs and IOs to which the social data, spatial data, temporal data and logical data relate;
logic executed by the processor for selecting the recipient RWE from the plurality of other RWEs based on the results of the graphing operation;
logic executed by the processor for identifying a delivery condition in the address string;
logic executed by the processor for determining the delivery condition is met by monitoring social data, spatial data, temporal data and logical data available to the network related to the delivery condition; and
logic executed by the processor for, in response to determining the delivery condition is met, transmitting, over the network, the first IO to the selected recipient RWE using a unique identifier associated with the recipient RWE.

16. The computing device of claim 15, such that logic for selecting the recipient RWE further comprises:
logic executed by the processor for identifying, based on the results of the graphing operation, a first plurality of identified RWEs comprising at least a subset of the plurality of other RWEs identified by the first non-unique descriptor;
logic executed by the processor for identifying, based on the results of the graphing operation, a second plurality of identified RWEs comprising at least a subset of the plurality of other RWEs identified by the second non-unique descriptor and the delivery condition;
logic executed by the processor for generating, based on the results of the graphing operation, a respective probability score for each combination of a respective one of the first plurality of identified RWEs and a respective one of the second plurality of identified RWEs;
logic executed by the processor for selecting one of the combinations based on the respective probability score of the respective combination; and
logic executed by the processor for selecting the recipient RWE from the RWEs in the selected combination based on the conditional operator.

17. The computing device of claim 15 further comprising:
logic executed by the processor for retrieving the unique identifier for the recipient RWE from a set of unique identifiers associated with the recipient RWE.

18. The computing device of claim 17, such that each unique identifier in the set of unique identifiers is associated with a respective one of a plurality of channels and the computing device further comprising:
logic executed by the processor for selecting, based on the request, a selected one of the plurality of communication channels for transmitting the first IO to the recipient RWE; and
logic executed by the processor for selecting the unique identifier for the recipient RWE associated with the selected one of the plurality of communication channels.

19. The computing device of claim 15 further comprising:
logic executed by the processor for identifying, based on the results of the graphing operation, a plurality of identified RWEs comprising at least a subset of the plurality of other RWEs identified by the first non-unique descriptor;
logic executed by the processor for generating a respective probability score for each RWE of the plurality of identified RWEs based on the results of the graphing operation;
logic executed by the processor for selecting the recipient RWE from the plurality of identified RWEs based on probability scores.

20. The computing device of claim 15 further comprising:
logic executed by the processor for identifying the first non-unique descriptor as a generic identifier for a service; and
logic executed by the processor for selecting the recipient RWE from a list of third RWEs associated with the service.

* * * * *